(12) United States Patent
Kucharski

(10) Patent No.: US 11,951,828 B2
(45) Date of Patent: Apr. 9, 2024

(54) AXLE ASSEMBLY FOR A VEHICLE

(71) Applicant: ALLISON TRANSMISSION, INC., Indianapolis, IN (US)

(72) Inventor: Cyril Kucharski, Saint Victor sur Loire (FR)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/206,434

(22) Filed: Jun. 6, 2023

(65) Prior Publication Data

US 2023/0311648 A1    Oct. 5, 2023

Related U.S. Application Data

(63) Continuation of application No. 17/591,282, filed on Feb. 2, 2022, now Pat. No. 11,667,191, which is a
(Continued)

(51) Int. Cl.
*B60K 17/16* (2006.01)
*B60B 35/12* (2006.01)
(Continued)

(52) U.S. Cl.
CPC .......... *B60K 17/165* (2013.01); *B60B 35/122* (2013.01); *B60B 35/14* (2013.01);
(Continued)

(58) Field of Classification Search
CPC ...... B60K 17/165; B60K 17/046; B60K 1/00; B60K 6/48; B60K 6/52; B60K 2001/001;
(Continued)

(56) References Cited

U.S. PATENT DOCUMENTS

| 1,093,631 A | 4/1914 | Kennedy |
| 1,984,830 A | 12/1934 | Higley |

(Continued)

FOREIGN PATENT DOCUMENTS

| CA | 1213470 A | 11/1986 |
| CN | 2541230 Y | 3/2003 |

(Continued)

OTHER PUBLICATIONS

English language abstract for CN207021829U extracted from espacenet.com database on Jan. 24, 2019, 1 page.

(Continued)

*Primary Examiner* — Steve Clemmons
(74) *Attorney, Agent, or Firm* — Barnes & Thornburg LLP

(57) ABSTRACT

Axle assembly includes first and second axle housings extending toward opposing sides of a vehicle frame with the axle housings aligned to define an axle axis, first and second wheel ends, first and second drive shafts disposed within the first and second axle housings, a gearbox having a first surface facing one side of the vehicle frame and a second surface facing the other side of the vehicle frame with the gearbox cantilevered outwardly relative to the aligned axle housings to define a gearbox axis parallel to a longitudinal axis of the vehicle frame and transverse to the axle axis, and an electric motor coupled to the second surface of the gearbox and extending toward the first side of the vehicle frame to define a motor axis that is parallel to and offset from the axle axis, transverse to the gearbox axis, and transverse to the longitudinal axis.

20 Claims, 16 Drawing Sheets

Related U.S. Application Data continuation of application No. 15/778,465, filed as application No. PCT/US2016/067136 on Dec. 16, 2016, now Pat. No. 11,247,556.

(60) Provisional application No. 62/333,032, filed on May 6, 2016, provisional application No. 62/268,852, filed on Dec. 17, 2015.

(51) Int. Cl.

| | |
|---|---|
| *B60B 35/14* | (2006.01) |
| *B60B 35/16* | (2006.01) |
| *B60K 1/00* | (2006.01) |
| *B60K 17/04* | (2006.01) |
| *F16H 57/03* | (2012.01) |
| *B60K 6/48* | (2007.10) |
| *B60K 6/52* | (2007.10) |
| *F16H 57/02* | (2012.01) |

(52) U.S. Cl.
CPC ........... *B60B 35/16* (2013.01); *B60K 1/00* (2013.01); *B60K 17/046* (2013.01); *F16H 57/03* (2013.01); *B60K 2001/001* (2013.01); *B60K 6/48* (2013.01); *B60K 6/52* (2013.01); *B60Y 2200/14* (2013.01); *B60Y 2200/22* (2013.01); *B60Y 2410/10* (2013.01); *F16H 2057/02034* (2013.01); *F16H 2057/02052* (2013.01)

(58) Field of Classification Search
CPC ....... B60B 35/122; B60B 35/14; B60B 35/16; F16H 57/03; F16H 2057/02034; F16H 2057/02052

See application file for complete search history.

(56) References Cited

U.S. PATENT DOCUMENTS

| | | | |
|---|---|---|---|
| 3,439,767 A | 4/1969 | LYnes et al. | |
| 3,799,284 A | 3/1974 | Hender | |
| 3,923,115 A | 12/1975 | Helling | |
| 4,270,622 A | 6/1981 | Travis | |
| 4,425,989 A | 1/1984 | Gotoda | |
| 4,431,073 A | 2/1984 | Nagao et al. | |
| 4,506,561 A * | 3/1985 | Hayakawa | F16H 57/025 |
| | | | 285/422 |
| 4,848,507 A | 7/1989 | Masuda et al. | |
| 5,120,282 A | 6/1992 | Fjallstrom | |
| 5,295,413 A | 3/1994 | Sherman | |
| 5,352,164 A | 10/1994 | Bensinger et al. | |
| 5,743,348 A | 4/1998 | Coppola et al. | |
| 5,832,789 A | 11/1998 | Kinto et al. | |
| 5,927,417 A | 7/1999 | Brunner | |
| 6,024,182 A | 2/2000 | Hamada et al. | |
| 6,059,684 A | 5/2000 | Sasaki et al. | |
| 6,276,474 B1 | 8/2001 | Ruppert et al. | |
| 6,382,339 B1 | 5/2002 | Nemoto | |
| 6,427,797 B1 | 8/2002 | Chang | |
| 6,431,298 B1 | 8/2002 | Ruppert, Jr. et al. | |
| 6,820,707 B1 | 11/2004 | Cantemir | |
| 6,843,750 B1 | 1/2005 | Bennett | |
| 6,964,317 B2 | 11/2005 | Groves et al. | |
| 6,973,982 B2 | 12/2005 | Yoshikawa et al. | |
| 7,028,583 B2 | 4/2006 | Bennett | |
| 7,041,023 B2 | 5/2006 | Bologna | |
| 7,115,058 B2 | 10/2006 | Duncan | |
| 7,128,680 B2 | 10/2006 | Holmes | |
| 7,143,861 B2 | 12/2006 | Chu | |
| 7,216,751 B2 | 5/2007 | Teraoka | |
| 7,258,644 B2 | 8/2007 | Ziech et al. | |
| 7,297,083 B2 | 11/2007 | Duncan | |
| 7,410,440 B2 | 8/2008 | Garcia et al. | |
| 7,458,433 B2 | 12/2008 | Harrup et al. | |
| 7,559,390 B2 | 7/2009 | Marsh et al. | |
| 7,572,201 B2 | 8/2009 | Supina et al. | |
| 7,819,411 B2 | 10/2010 | Eshelman et al. | |
| 7,854,674 B2 | 12/2010 | Freudenreich | |
| 7,959,170 B2 | 6/2011 | Mauz | |
| 8,118,133 B2 | 2/2012 | Armfield | |
| 8,465,035 B2 | 6/2013 | Gander | |
| 8,475,311 B2 | 7/2013 | Ren et al. | |
| 8,491,432 B2 | 7/2013 | Radermacher et al. | |
| 8,517,140 B2 | 8/2013 | West et al. | |
| 8,640,801 B2 | 2/2014 | Hennings et al. | |
| 8,678,968 B2 | 3/2014 | Troennberg et al. | |
| 8,708,857 B2 | 4/2014 | Winter et al. | |
| 8,718,897 B2 | 5/2014 | Wright et al. | |
| 8,839,898 B2 | 9/2014 | Mimura et al. | |
| 8,858,379 B2 | 10/2014 | Keeney et al. | |
| 8,899,381 B2 | 12/2014 | Ebihara et al. | |
| 8,911,312 B2 | 12/2014 | Itoo et al. | |
| 8,936,130 B2 | 1/2015 | Hirashita et al. | |
| 9,102,233 B2 | 8/2015 | Knoblauch et al. | |
| 9,115,792 B2 | 8/2015 | Skotty | |
| 9,140,335 B2 | 9/2015 | Knoblauch | |
| 9,221,496 B2 | 12/2015 | Barr et al. | |
| 9,267,596 B2 | 2/2016 | Trost | |
| 9,296,389 B2 | 3/2016 | Bernhardt | |
| 9,400,034 B1 | 7/2016 | Pritchard et al. | |
| 9,421,862 B2 | 8/2016 | Wang | |
| 9,429,222 B2 | 8/2016 | Bassi et al. | |
| 9,469,214 B2 | 10/2016 | Wright et al. | |
| 9,517,658 B2 | 12/2016 | Chung et al. | |
| 9,541,121 B2 | 1/2017 | Knoblauch | |
| 9,573,452 B2 | 2/2017 | Agnew | |
| 9,593,754 B2 | 3/2017 | Sten | |
| 9,719,584 B1 | 8/2017 | Duan et al. | |
| 9,771,037 B2 | 9/2017 | Kugelstadt et al. | |
| 9,878,638 B2 | 1/2018 | Wein et al. | |
| D821,930 S | 7/2018 | Kucharski | |
| 10,933,725 B2 | 3/2021 | Ries-Mueller et al. | |
| 2002/0104704 A1 | 8/2002 | Chang | |
| 2003/0111280 A1 | 6/2003 | Platner et al. | |
| 2005/0006164 A1 | 1/2005 | Teraoka | |
| 2005/0023053 A1 | 2/2005 | Bennett | |
| 2005/0023885 A1 | 2/2005 | Bennett | |
| 2006/0094552 A1 | 5/2006 | Duncan | |
| 2006/0225930 A1 | 10/2006 | Schulte | |
| 2009/0014223 A1 | 1/2009 | Jones et al. | |
| 2010/0276901 A1 | 11/2010 | Richardson et al. | |
| 2011/0094807 A1 | 4/2011 | Pruitt et al. | |
| 2011/0175475 A1 | 7/2011 | Makino et al. | |
| 2011/0259657 A1 | 10/2011 | Fuechtner | |
| 2012/0080247 A1 | 4/2012 | Schmid et al. | |
| 2012/0247855 A1 | 10/2012 | Mimura et al. | |
| 2013/0019707 A1 | 1/2013 | Ebihara et al. | |
| 2013/0240282 A1 | 9/2013 | Bindl | |
| 2013/0333959 A1 | 12/2013 | Wagemann et al. | |
| 2014/0095002 A1 | 4/2014 | Crecelius et al. | |
| 2014/0288739 A1 | 9/2014 | Braun et al. | |
| 2014/0295979 A1 | 10/2014 | Knoblauch | |
| 2015/0266373 A1 | 9/2015 | Wang | |
| 2016/0138659 A1 | 5/2016 | Strandberg | |
| 2016/0159249 A1 | 6/2016 | Wright et al. | |
| 2017/0219078 A1 | 8/2017 | Wang et al. | |
| 2017/0261082 A1 | 9/2017 | Pritchard et al. | |
| 2017/0320384 A1 | 11/2017 | Kochidomari et al. | |
| 2018/0022230 A1 | 1/2018 | Wright et al. | |
| 2018/0080536 A1 | 3/2018 | Nilsson | |
| 2018/0119754 A1 | 5/2018 | Teillet | |
| 2019/0217700 A1 | 7/2019 | Nishizawa et al. | |
| 2021/0006127 A1 | 1/2021 | Chen et al. | |

FOREIGN PATENT DOCUMENTS

| | | |
|---|---|---|
| CN | 2600273 Y | 1/2004 |
| CN | 200971047 Y | 11/2007 |
| CN | 201151343 Y | 11/2008 |
| CN | 101492006 A | 7/2009 |
| CN | 201312154 Y | 9/2009 |
| CN | 202156239 U | 3/2012 |
| CN | 102606718 A | 7/2012 |

(56) References Cited

FOREIGN PATENT DOCUMENTS

| | | |
|---|---|---|
| CN | 202480779 U | 10/2012 |
| CN | 2012132698 A1 | 10/2012 |
| CN | 103434390 A | 12/2013 |
| CN | 103496320 A | 1/2014 |
| CN | 203992104 U | 12/2014 |
| CN | 104309429 A | 1/2015 |
| CN | 204095429 U | 1/2015 |
| CN | 104728403 A | 6/2015 |
| CN | 104791477 A * | 7/2015 |
| CN | 205326780 U | 6/2016 |
| CN | 205326801 U | 6/2016 |
| CN | 105799480 A | 7/2016 |
| CN | 103010016 B | 8/2016 |
| CN | 205468492 U | 8/2016 |
| CN | 205951712 U | 2/2017 |
| CN | 205951969 U | 2/2017 |
| CN | 103538474 B | 9/2017 |
| CN | 105034789 B | 9/2017 |
| CN | 105150862 B | 9/2017 |
| CN | 107215393 A | 9/2017 |
| CN | 104986032 B | 10/2017 |
| CN | 107244234 A | 10/2017 |
| CN | 107284214 A | 10/2017 |
| CN | 107284224 A | 10/2017 |
| CN | 206551871 A | 10/2017 |
| CN | 105818861 B | 11/2017 |
| CN | 107344488 A | 11/2017 |
| CN | 206633786 B | 11/2017 |
| CN | 206749495 U | 12/2017 |
| CN | 206812717 U | 12/2017 |
| CN | 206943366 U | 1/2018 |
| CN | 104728403 B | 2/2018 |
| CN | 207021829 U | 2/2018 |
| CN | 207225059 U | 4/2018 |
| DE | 102012204717 A1 | 9/2013 |
| DE | 102013005721 A1 | 10/2014 |
| DE | 102013214317 A1 | 1/2015 |
| DE | 102016203970 A1 | 9/2017 |
| DE | 112015004318 T5 | 10/2017 |
| EP | 0079455 A1 | 5/1983 |
| FR | 2995569 A1 | 3/2014 |
| FR | 3003813 A1 | 10/2014 |
| GB | 2548975 A | 10/2017 |
| JP | 2013068248 A | 4/2013 |
| JP | 6209297 B1 | 10/2017 |
| WO | 8804241 A1 | 6/1988 |
| WO | 9221529 A1 | 12/1992 |
| WO | 2004094868 A1 | 11/2004 |
| WO | 2013087527 A1 | 6/2013 |
| WO | 2013170848 A1 | 11/2013 |
| WO | 2017106620 A1 | 6/2017 |
| WO | 2017114420 A1 | 7/2017 |
| WO | 2017144905 A1 | 8/2017 |
| WO | 2017172614 A1 | 10/2017 |
| WO | 2017172722 A1 | 10/2017 |
| WO | 2017172788 A1 | 10/2017 |
| WO | 2017193130 A1 | 11/2017 |
| WO | 2017216020 A1 | 12/2017 |

OTHER PUBLICATIONS

English language abstract for CN207225059U extracted from espacenet.com database on Jan. 24, 2019, 1 page.
English language abstract for DE102012204717A1 extracted from espacenet.com database on Jan. 24, 2019, 1 page.
English language abstract for JP2013068248A extracted from espacenet.com database on Jan. 24, 2019, 1 page.
English language abstract for WO2013170848A1 extracted from espacenet.com database on Jan. 24, 2019, 2 pages.
English language abstract for WO2017216020A1 extracted from espacenet.com database on Jan. 24, 2019, 1 page.
Office Action for corresponding India Application 201847021856 dated Aug. 7, 2020, 6 pages.
European Search Report for corresonding EP application 16876756.4 dated Aug. 19, 2019, 7 pages.
Office Action for corresponding Chinese Application CN201680073825 dated Sep. 23, 2020.
Office Action for corresponding Chinese Application CN201680073825 dated Jul. 2, 2021.
Rejection Decision issued in corresponding Chinese Application CN201680073825 dated Dec. 3, 2021, 5 pages, no translation available.
Office Action for corresponding EP application 16876756.4 dated Dec. 7, 2021, 5 pages.
English language abstract and computer-generated English translation for CN 201312154Y extraced from Thomson Reuters database on Nov. 2, 2015, 6 pages.
English language abstract and computer-generated English translation for CN 202480779U extracted from Thomson Reuters database on Nov. 24, 2015, 5 pages.
English language abstract and computer-generated English translation for CN 203992104U extracted from Thomson Reuters database on Feb. 8, 2016, 6 pages.
English language abstract and computer-generated English translation for CN 104309429A extracted from espacenet.com database on Sep. 27, 2016, 8 pages.
English language abstract and computer-generated English translation for CN 204095429U extracted from espacenet.com database on Sep. 27, 2016, 9 pages.
Computer-generated English language abstract and computer-generated English language translation for CN 107244234A extracted from espacenet.com database on Dec. 13, 2017, 14 pages.
Computer-generated English language abstract and computer-generated English language translation for CN 206633786U extracted from espacenet.com database on Dec. 13, 2017, 11 pages.
Computer-generated English language abstract for CN 107284224A extracted from espacenet.com database on Dec. 13, 2017, 2 pages.
Computer-generated English language abstract for CN 107215393A extracted from espacenet.com database on Dec. 13, 2017, 2 pages.
Computer-generated English language abstract for CN 107284214A extracted from espacenet.com database on Dec. 13, 2017, 2 pages.
Computer-generated English language abstract for CN 107344488A extracted from espacenet.com database on Dec. 13, 2017, 2 pages.
Computer-generated English language abstract for CN 206551871U extracted from espacenet.com database on Dec. 13, 2017, 2 pages.
Computer-generated English language abstract and computer-generated English language translation for CN 205951712U extracted from LexisNexis database on Apr. 12, 2017, 6 pages.
English language abstract and computer-generated English language translation for CN 103434390A extracted from espacenet.com database on May 24, 2017, 12 pages.
English language abstract and computer-generated English language translation for CN 103496320A extracted from espacenet.com database on May 24, 2017, 4 pages.
English language abstract and computer-generated English language translation for CN 105034789B extracted from espacenet.com database on Dec. 13, 2017, 9 pages.
English language abstract and computer-generated English language translation for CN 105818861B extracted from espacenet.com database on Dec. 13, 2017, 9 pages.
English language abstract and computer-generated English language translation for CN 200971047Y extracted from espacenet.com database on May 24, 2017, 6 pages.
English language abstract and computer-generated English language translation for CN 205326780U extracted from LexisNexis database on May 26, 2017, 20 pages.
English language abstract and computer-generated English language translation for CN 205326801U extracted from LexisNexis database on May 26, 2017, 22 pages.
English language abstract and computer-generated English language translation for CN 205468492U extracted from LexisNexis database on May 26, 2017, 23 pages.
English language abstract and computer-generated English language translation for CN 2541230Y extracted from espacenet.com database on May 24, 2017, 7 pages.

(56) References Cited

OTHER PUBLICATIONS

English language abstract and computer-generated English language translation for CN 2600273Y extracted from espacenet.com database on May 24, 2017, 4 pages.
English language abstract and computer-generated English language translation for CN 105150862B extracted from espacenet.com database on Dec. 13, 2017, 22 pages.
English language abstract and computer-generated English language translation for CN 104986032B extracted from espacenet.com database on Dec. 18, 2017, 9 pages.
English language abstract for CN 103538474B extracted from espacenet.com on Dec. 13, 2017, 1 page.
Computer-generated English language abstract and computer-generated English language translation for DE 102016203970A1 extracted from espacenet.com database on Dec. 13, 2017, 10 pages.
English language abstract for DE 112015004318T5 extracted from espacenet.com database on Dec. 13, 2017, 2 pages.
English language abstract for FR 3003813A1 extracted from espacenet.com database on Sep. 28, 2016, 1 page.
English language abstract for JP 6209297B1 extracted from LexisNexis database on Dec. 13, 2017, 1 page.
English language abstract and computer-generated English translation for WO 2013/087527A1 extracted from espacenet.com database on Sep. 28, 2016, 15 pages.
English language abstract and computer-generated English translation for WO 88/04241A1 extracted from espacenet.com database on Sep. 28, 2016, 12 pages.
International Search Report for Application No. PCT/US2016/067136 dated Apr. 27, 2017, 4 pages.
International Search Report for Application No. PCT/US2017/031570 dated Jul. 20, 2017, 1 page.
Design U.S. Appl. No. 29/570,932, filed Jul. 13, 2016, 33 pages.
Design U.S. Appl. No. 29/632,821, filed Jan. 10, 2018, 33 pages.
U.S. Appl. No. 62/268,852, filed Dec. 17, 2015, 13 pages.
U.S. Appl. No. 62/333,032, filed May 6, 2016, 17 pages.
Computer-generated English language abstract for DE102013005721A1 extracted from espacenet.com database on Jan. 24, 2019, 3 pages.
Computer-generated English language abstract for DE102103214317A1 extracted from espacenet.com database on Jan. 24, 2019, 2 pages.
English language abstract for CN103010016B extracted from espacenet.com database on Jan. 24, 2019, 2 pages.
English language abstract for CN104728403B extracted from espacenet.com database on Jan. 24, 2019, 2 pages.
English language abstract for CN105799480A extracted from espacenet.com database on Jan. 24, 2019, 1 page.
English language abstract for CN201151343Y extracted from espacenet.com database on Jan. 24, 2019, 1 page.
English language abstract for CN206749495U extracted from espacenet.com database on Jan. 24, 2019, 1 page.
English language abstract for CN206812717U extracted from espacenet.com database on Jan. 24, 2019, 1 page.
English language abstract for CN206943366U extracted from espacenet.com database on Jan. 24, 2019, 1 page.
Extended Search Report issued in Appl No. EP16876756.4 (dated Aug. 19, 2019).
Office Action for Chinese Application No. 201680073825.3, dated Dec. 3, 2021, 5 pages.
Office Action for European Application No. 16876756.4, dated Dec. 7, 2021, 5 pages.

\* cited by examiner

AXLE ASSEMBLY FOR A VEHICLE

CROSS-REFERENCE TO RELATED APPLICATIONS

The present application is a continuation application of, and claims priority to, U.S. patent application Ser. No. 17/591,282, entitled "AXLE ASSEMBLY FOR A VEHICLE," which was filed on Feb. 2, 2022 and which is a continuation application of, and claims priority to, U.S. patent application Ser. No. 15/778,465, entitled "AXLE ASSEMBLY FOR A VEHICLE," which was filed on May 23, 2018, which is a national stage filing under 35 U.S.C. § 371(c) of International Application No. PCT/US2016/067136, which was filed on Dec. 16, 2016, and which claims the benefit of U.S. Provisional Patent Application No. 62/333,032, which was filed on May 6, 2016, and U.S. Provisional Patent Application No. 62/268,852, which was filed on Dec. 17, 2015, the entirety of each of which is expressly incorporated herein by reference.

FIELD OF THE DISCLOSURE

The present disclosure relates generally to vehicle axles and, more particularly, to an axle assembly for a vehicle.

BACKGROUND

Axles are commonly used in vehicles having wheels, such as passenger cars and/or trucks, mass transit vehicles such as city and/or commercial buses, agricultural vehicles, semi-trucks, trailers, and/or the like. Electric axles, i.e., axles having an electric motor, are increasing in popularity. However, given the limited amount of space under the vehicle floor, suitable and effective attachment of the electric motor to the axle has become a challenge. The present disclosure is aimed at solving the challenge identified above.

SUMMARY

In one embodiment of the present disclosure, a vehicle comprises: a vehicle frame having front and rear ends and opposing first and second sides; a floor coupled to the vehicle frame and extending between the front and rear ends to define a longitudinal axis adapted to extend along a length of the vehicle, and the floor further extending at least between the first and second sides to define a width-wise axis adapted to extend along a width of the vehicle; a first axle housing and a second axle housing each having first and second housing ends with the first housing end of the first axle housing extending toward the first side of the vehicle frame and the first housing end of the second axle housing extending toward the second side of the vehicle frame, and the first and second axle housings being aligned to define an axle axis parallel to the width-wise axis; a first wheel end coupled to the first housing end of the first axle housing adjacent the first side of the vehicle frame, a second wheel end coupled to the first housing end of the second axle housing adjacent the second side of the vehicle frame; a first drive shaft at least partially disposed within the first axle housing and coupled to the first wheel end; a second drive shaft at least partially disposed within the second axle housing and coupled to the second wheel end; a gearbox having a body with the body having a first surface facing the first side of the vehicle frame and a second surface facing the second side of the vehicle frame with the first axle housing coupled to the first surface and the second axle housing coupled to the second surface, and the gearbox being cantilevered outwardly relative to the aligned first and second axle housings to define a gearbox axis parallel to the longitudinal axis and transverse to the axle axis; and an electric motor coupled to the second surface of the gearbox and extending toward the first side of the vehicle frame to define a motor axis with the motor axis being parallel to and offset from the axle axis, parallel to the width-wise axis, transverse to the gearbox axis, and transverse to the longitudinal axis with the electric motor coupled to the first and second drive shafts to rotate the first and second wheel ends.

In another embodiment of the present disclosure, an axle assembly comprises: a first axle housing having first and second housing ends; a second axle housing having first and second axle housings; a first wheel end coupled to the first housing end of the first axle housing; a second wheel end coupled to the first housing end of the second axle housing; a first drive shaft at least partially housed within the first axle housing and coupled to the first wheel end; a second drive shaft at least partially housed within the second axle housing and coupled to the second wheel end; a gearbox having a body defining a perimeter with the body having first and second portions defining a cavity with the first axle housing coupled to the first portion and the second axle housing coupled to the second portion such that the first and second axle housings extend in opposing directions, and the first and second axle housings being aligned to define an axle axis, and the gearbox being cantilevered relative to the aligned first and second axle housings to define a gearbox axis transverse to the axle axis; and an electric motor coupled to the first portion of the body adjacent the first axle housing and extending away from the first portion to define a motor axis parallel to and offset from the axle axis and transverse to the gearbox axis; wherein the gearbox further includes a flange extending outwardly from the perimeter of the body and a support rib directly coupling the flange to the body.

BRIEF DESCRIPTION OF THE DRAWINGS

Advantages of the present disclosure will be readily appreciated, as the same becomes better understood by reference to the following detailed description, when considered in connection with the accompanying drawings. It is to be appreciated that the figures are merely illustrative and are not necessarily drawn to scale. It is further to be appreciated that various features of the vehicle and/or the axle assembly are illustrated schematically in one or more of the figures at least for purposes of simplifying the figure(s).

DETAILED DESCRIPTION

Referring now to the figures, wherein like numerals indicate corresponding parts throughout the several views, various embodiments of an axle assembly 100, 200 are shown throughout the figures and are described in detail below. In certain embodiments, the axle assembly 100 is a drive steer axle for any type of vehicle 10. In other embodiments, the axle assembly 200 is a rigid axle for any type of vehicle 10. Non-limiting examples of the vehicle 10 include a mass transit vehicle (such as a city bus, a commercial bus, a trolley vehicle, etc.), a school bus, a commercial semi-truck and associated trailers, an agricultural vehicle, a passenger car or truck, and/or the like. If used on a trailer, the trailer may be coupled to a semi-truck and may have a plurality of axle assemblies 200. In alternative embodiments, the axle assembly 100, 200 may also include a planetary, may be part of a tandem axle, and/or may have a variety of additional features.

Figure 1:
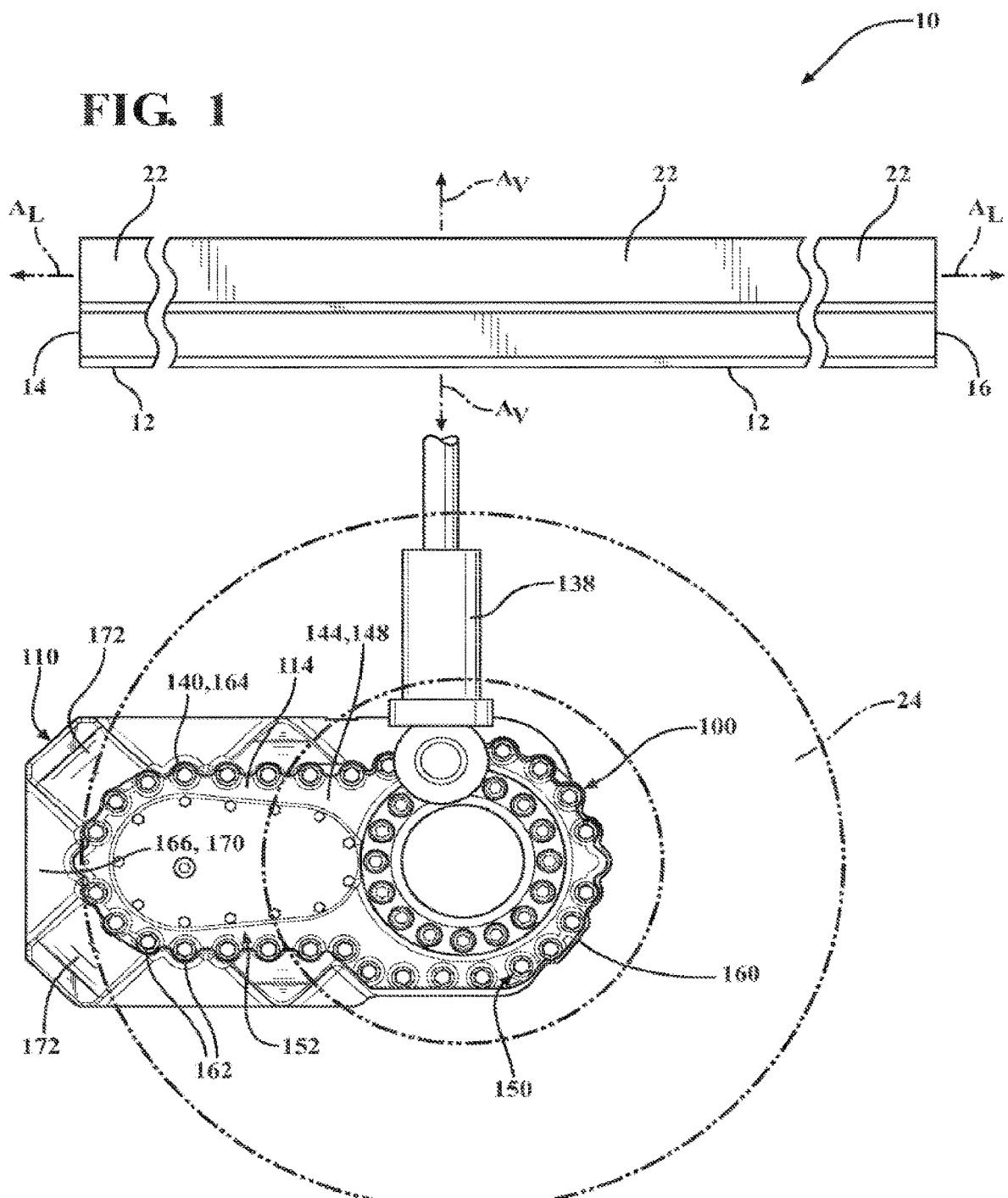
FIG. 1 is a semi-schematic side view of a portion of a vehicle illustrating a vehicle frame supporting a vehicle floor and a portion of an embodiment of an axle assembly coupled to the vehicle frame.
Figure 2:
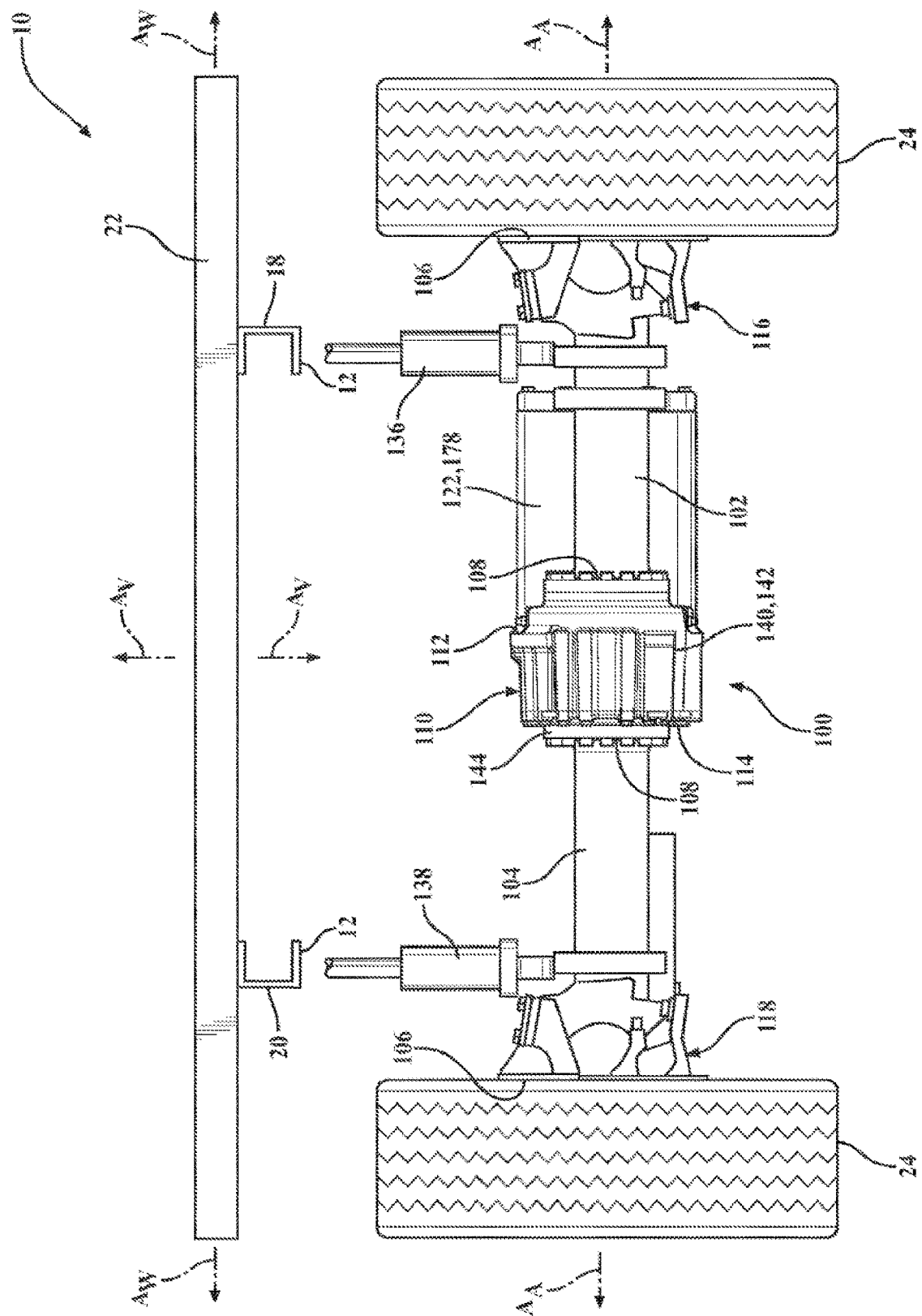
FIG. 2 is a semi-schematic rear view of a portion of the vehicle illustrating the vehicle frame supporting the vehicle floor and the axle assembly of FIG. 1 coupled to the vehicle frame.

FIGS. 1 and 2 semi-schematically illustrate a portion of the vehicle 10 including the axle assembly 100. The vehicle 10 includes a chassis having a vehicle frame 12. The vehicle frame 12 has front 14 and rear 16 ends and opposing first 18 and second 20 sides. The vehicle 10 further includes a floor 22 coupled to the vehicle frame 12 and extending between the front 14 and rear 16 ends to define a longitudinal axis $A_L$ adapted to extend along a length of the vehicle 10. The floor 22 further extends at least between the first 18 and second 20 sides to define a width-wise axis $A_W$ adapted to extend along a width of the vehicle 10. The vehicle frame 12 and the floor 22 are schematically illustrated in FIGS. 1 and 2, and the vehicle frame 12 may therefore be larger or smaller in the width-wise direction (i.e., along the width-wise axis $A_W$). Accordingly, the floor 22 may extend between the first 18 and second 20 sides of the vehicle frame 12 or beyond the first 18 and second 20 sides of the vehicle frame 12.

The axle assembly 100 for the vehicle 10 is a steerable or steer drive axle, and includes a first axle housing 102 and a second axle housing 104, with each of the axle housings 102, 104 having first 106 and second 108 housing ends. As shown in FIG. 2, the first housing end 106 of the first axle housing 102 extends toward the first side 18 of the vehicle frame 12, and the first housing end 106 of the second axle housing 104 extends toward the second side 20 of the vehicle frame 12. The second housing ends 108 of the first 102 and second 104 axle housings are coupled to a gearbox 110. The second housing ends 108 of the first 102 and second 104 axle housings coupled to the gearbox 110 are shown schematically in the figures, as the first 102 and second 104 axle housings can be coupled to the gearbox 110 in any suitable manner. In an embodiment, the first 102 and second 104 axle housings are mirror-images of one another. The axle housings 102, 104 may be made of or include any suitable material.

The first 102 and second 104 axle housings are aligned to define an axle axis $A_A$ parallel to the width-wise axis $A_W$. For example, and as shown, the axle assembly 100 further includes the gearbox 110 having first 112 and second 114 surfaces with the first surface 112 facing the first side 18 of the vehicle frame 12 and the second surface 114 facing the second side 20 of the vehicle frame 12. In other words, the first 112 and second 114 surfaces oppose one another. The second housing ends 108 of the first 102 and second 104 axle housings are coupled to the first 112 and second 114 surfaces, respectively, such that the second ends 108 of the first 102 and second 104 axle housings are aligned. The first 102 and second 104 axle housings extend along the axle axis $A_A$ in opposing directions. For example, the first axle housing 102 extends along a direction toward the first side 18 of the vehicle frame 12, and the second axle housing 104 extends along the axle axis $A_A$ in a direction toward the second side 104 of the vehicle frame 12.

Each of the first 102 and second 104 axle housings is a non-rotating housing; i.e., the axle housings 102, 104 do not rotate during operation of the vehicle 10. Accordingly, the first 102 and second 104 axle housings are fixed to the gearbox 110 in any suitable manner, such as with one or more fasteners or the like.

Figure 3:
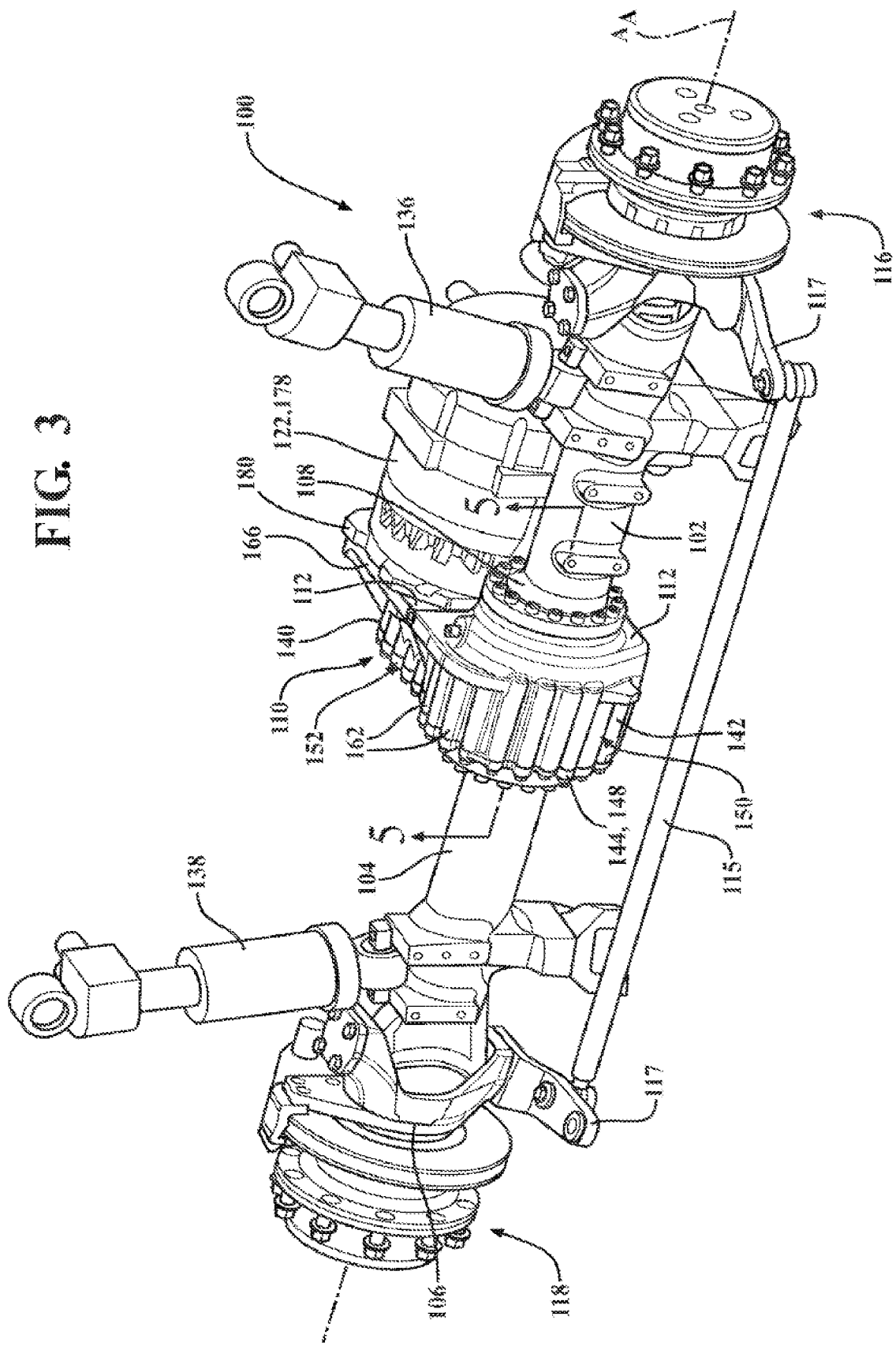
FIG. 3 is a perspective rear view of an embodiment of the axle assembly illustrated in FIGS. 1 and 2, including suspension and steering components.
Figure 4:
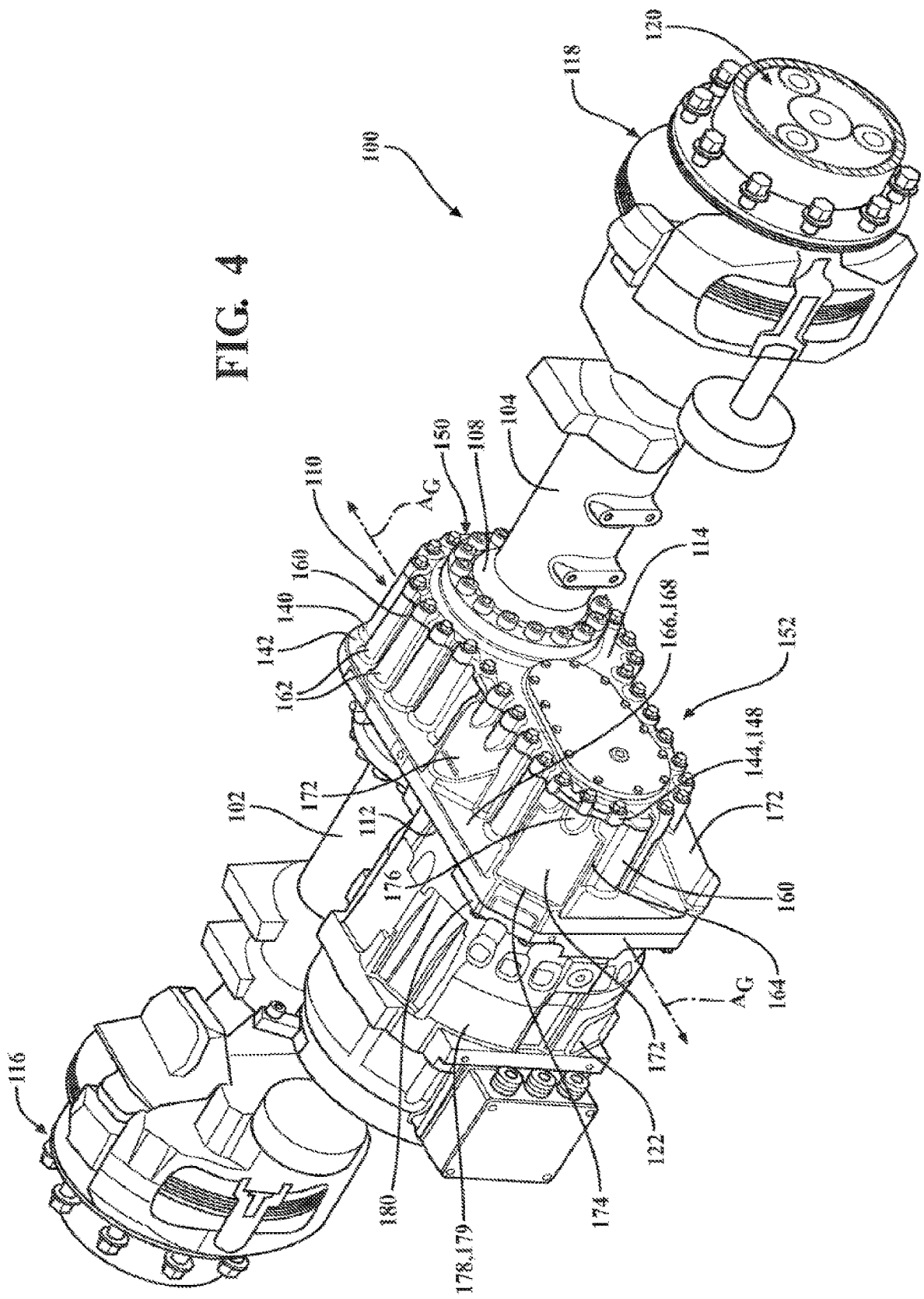
FIG. 4 is a perspective front view of the axle assembly illustrated in FIGS. 1 and 2.
Figure 5:
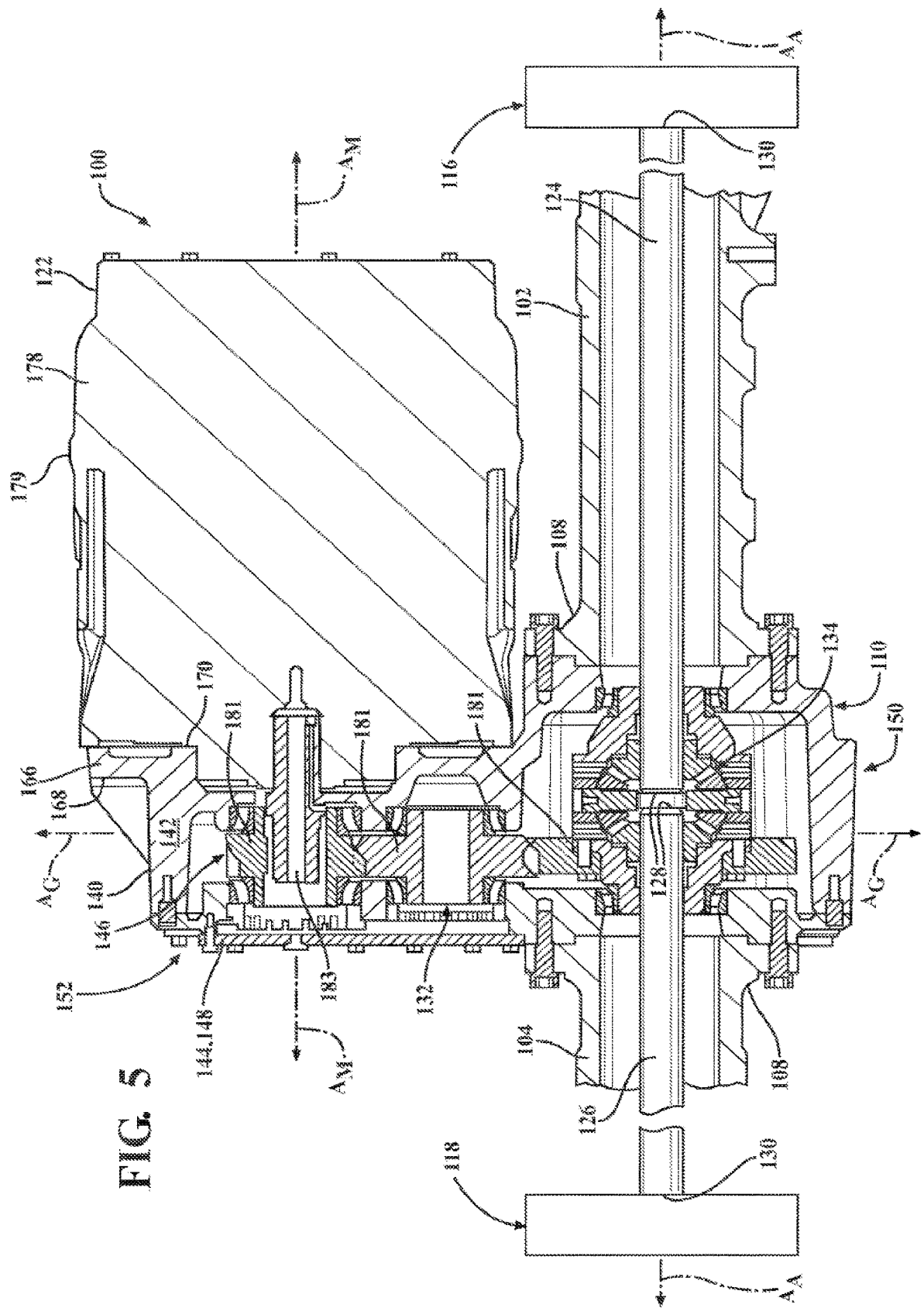
FIG. 5 is a cross-sectional view of a portion of the axle assembly taken along line 5-5 in FIG. 3.

In an embodiment, and as shown in FIG. 3, the axle assembly 100 may further include a stabilizing bar 115, with ends of the stabilizing bar 115 coupled to the first 102 and second 104 axle housings via brackets 117. The brackets 117 are configured to be coupled to a steering column of the vehicle 10. Accordingly, the stabilizing bar 115 extends between the brackets 117 and substantially parallel to the axle axis $A_A$.

The axle assembly 100 further includes a first wheel end 116 coupled to the first housing end 106 of the first axle housing 102 adjacent the first side 18 of the vehicle frame 12, and a second wheel end 118 coupled to the first housing end 106 of the second axle housing 104 adjacent the second side 20 of the vehicle frame 12. In an embodiment, the first 116 and second 118 wheel ends may be coupled to the second housing ends 108 by an articulated system. Each of the first 116 and second 118 wheel ends is coupled to at least one vehicle wheel or tire 24. Each of the first 116 and second 118 wheel ends may also have a plurality of gears, such as a planetary gear set 120 including a gear ratio. The transmission is given to the wheels 24 by a reduction inside the respective steer wheel ends 116, 118, including the gear ratio. Utilizing power generated by an electric motor 122, the first 116 and second 118 wheel ends enable rotational motion of the wheel(s) 24 in a forward direction causing the vehicle 10 to move forwards or in a backward direction causing the vehicle 10 to move backwards. In an embodiment, each of the wheel ends 116, 118 may also include a dry disk brake.

The axle assembly 110 further includes first 124 and second 126 drive shafts. The first drive shaft 124 is at least partially disposed within the first axle housing 102 and coupled to the first wheel end 116, and the second drive shaft 126 is at least partially disposed within the second axle housing 104 and coupled to the second wheel end 118. For example, a portion of the first drive shaft 124 may be disposed through the first axle housing 102, and a remaining portion of the first drive shaft 124 may be disposed within the gearbox 110. Likewise, a portion of the second drive shaft 126 may be disposed through the second axle housing 104, and a remaining portion of the second drive shaft 126 may be disposed within the gearbox 110. As shown, each of the first 124 and second 126 drive shafts have first 128 and second 130 shaft ends. Each of the first shaft ends 128 is coupled to a gear set 132 disposed within the gearbox 110, and each of the second shaft ends 130 is coupled to the first 116 and second 118 wheel ends, respectively. The drive shafts 124, 126 deliver power (generated by the electric motor 122) from the gear set 132 in the gearbox 110 to the wheels 24 of the vehicle 10. Typically, the first 124 and second 126 drive shafts rotate within the respective first 102 and second 104 axle housings when powered or activated by the electric motor 122 without engaging or otherwise rotating the axle housings 102, 104.

The first 124 and second 126 drive shafts can be any suitable drive or propeller shaft. In an embodiment, each of the first 124 and second 126 drive shafts is a cardan shaft. It is to be appreciated that the drive shafts 124, 126 can be any mechanical component that can suitably transmit torque and rotation and/or deliver power to the wheels 24, and is not limited to a drive or propeller shaft.

In an embodiment, the axle assembly 100 further includes a differential 134 disposed between the first 124 and second 126 drive shafts. The differential 134 is coupled to the drive shafts 124, 126, and allows each of the wheel ends 116, 118 to rotate at different speeds. This facilitates handling of the vehicle 10, such as by enabling ease of turning the vehicle 10. For instance, when the vehicle 10 is turning, the differential 134 allows the wheel(s) 24 coupled to the wheel end 116, 118 at one side of the vehicle 10 to rotate faster than the wheel(s) 24 coupled to the other wheel end 116, 118 at the other side of the vehicle 10.

In an embodiment, the axle assembly 100 further includes first 136 and second 138 suspension components, which may be part of a suspension system such as an air suspension system. The first suspension component 136 coupled to the first axle housing 102 and the vehicle frame 12, and the second suspension component 138 coupled to the second axle housing 102 and the vehicle frame 12. In an embodiment, the first 136 and second 138 suspension components are resiliently mounted to the vehicle frame 12 through a spring, a damper, or other biasing component or arrangement. The suspension system stabilizes the vehicle, such as by allowing relative movement between the vehicle frame 12 and the vehicle wheels 24 as the vehicle 10 is moving. In this way, the suspension system contributes to the handling and the ride quality of the vehicle 10, as the suspension system provides the passengers with an even and smooth ride despite driving over road bumps or potholes, etc.

As previously mentioned, the axle assembly 100 further includes the gearbox 110 that houses the plurality of gears 132 commonly referred to as a gear set or drive train. In an embodiment, the differential 134 is at least partially disposed within the gearbox 110. The gearbox 110 may be centrally or substantially centrally located between the first 116 and second 118 wheel ends. With this configuration, the gearbox 110 forms a central portion of the axle assembly 100. It is to be understood that the gearbox 110 is schematically or semi-schematically shown in the figures, and therefore certain features of the gearbox 110 are not shown.

The gearbox 110 has a body 140. The body 140 has the first surface 112 facing the first side 18 of the vehicle frame 12 and the second surface 114 facing the second side 20 of the vehicle frame 12. As shown, the first axle housing 102 is coupled to the first surface 112 of the body 140, and the second axle housing 104 is coupled to the second surface 114 of the body 140. In addition, the gearbox 110 is cantilevered outwardly relative to the aligned first 102 and second 104 axle housings to define a gearbox axis $A_G$ parallel to the longitudinal axis $A_L$ and transverse to the axle axis $A_A$. The gearbox 110 is also spaced vertically downward from the floor 22 of the vehicle 10 along a vertical axis $A_Y$ perpendicular to and intersecting both of the axle axis $A_A$ and the gearbox axis $A_G$.

In an embodiment, the body 140 of the gearbox 110 may have multiple portions. The multiple portions of the gearbox 110 may enable ease of assembly and/or maintenance of the several components of the axle assembly 100, such as the assembly and/or maintenance of components inside the gearbox 110. In an embodiment, the body 140 may have first 142 and second 144 portions with the portions 142, 144 defining a cavity 146 for receiving the gear set 132. In the embodiment shown in FIGS. 1-8, one of the portions 142, 144 of the body 140 may define the cavity 146, while the other portion 142, 144 may define a cover 148 for covering the cavity 146. It is contemplated that the body 140 of the gearbox 110 may have any suitable configuration, for example, the body 140 could be a substantially single piece. It is also contemplated that the body 140 of the gearbox 110 can be made from any suitable material, not limited to metals and/or metal alloys. Further details of the gearbox 110 are described below.

The body 140 of the gearbox 110 may have any suitable shape. In an embodiment, the body 140 has an oblong shape, which may resemble an oval shape or a rectangular shape with soft or rounded edges. In one particular embodiment, the body 140 has an oblong shape having a larger segment 150 (in terms of area and/or surface area) that blends into a smaller segment 152 (also in terms of area and/or surface area). As shown, the first 102 and second 104 axle housings are coupled to the larger segment 150 of the body 140, and the electric motor 122 is coupled to the smaller segment 152 of the body 140.

Figure 6:
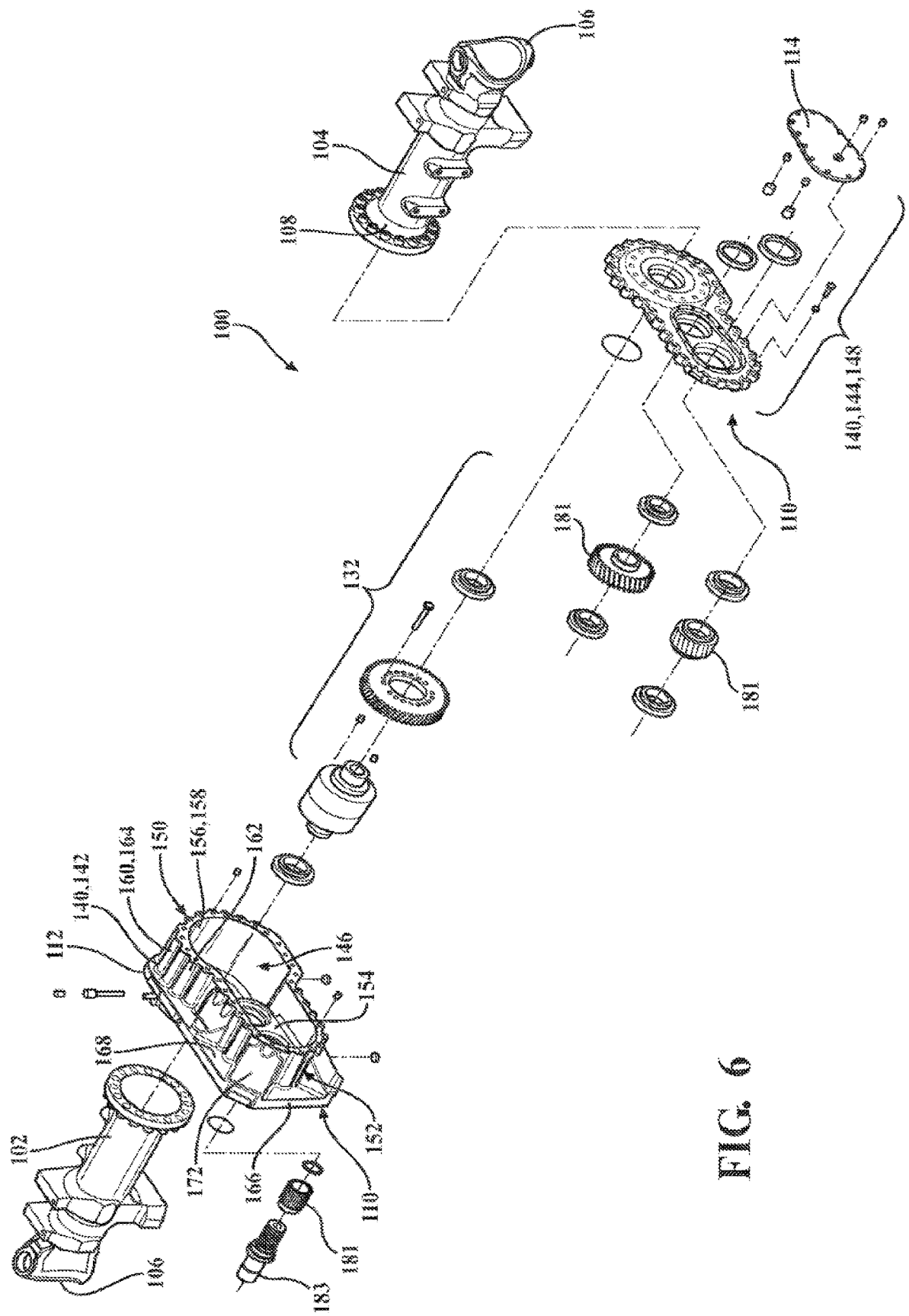
FIG. 6 is an exploded view of a portion of the axle assembly of FIG. 4.
Figure 7:
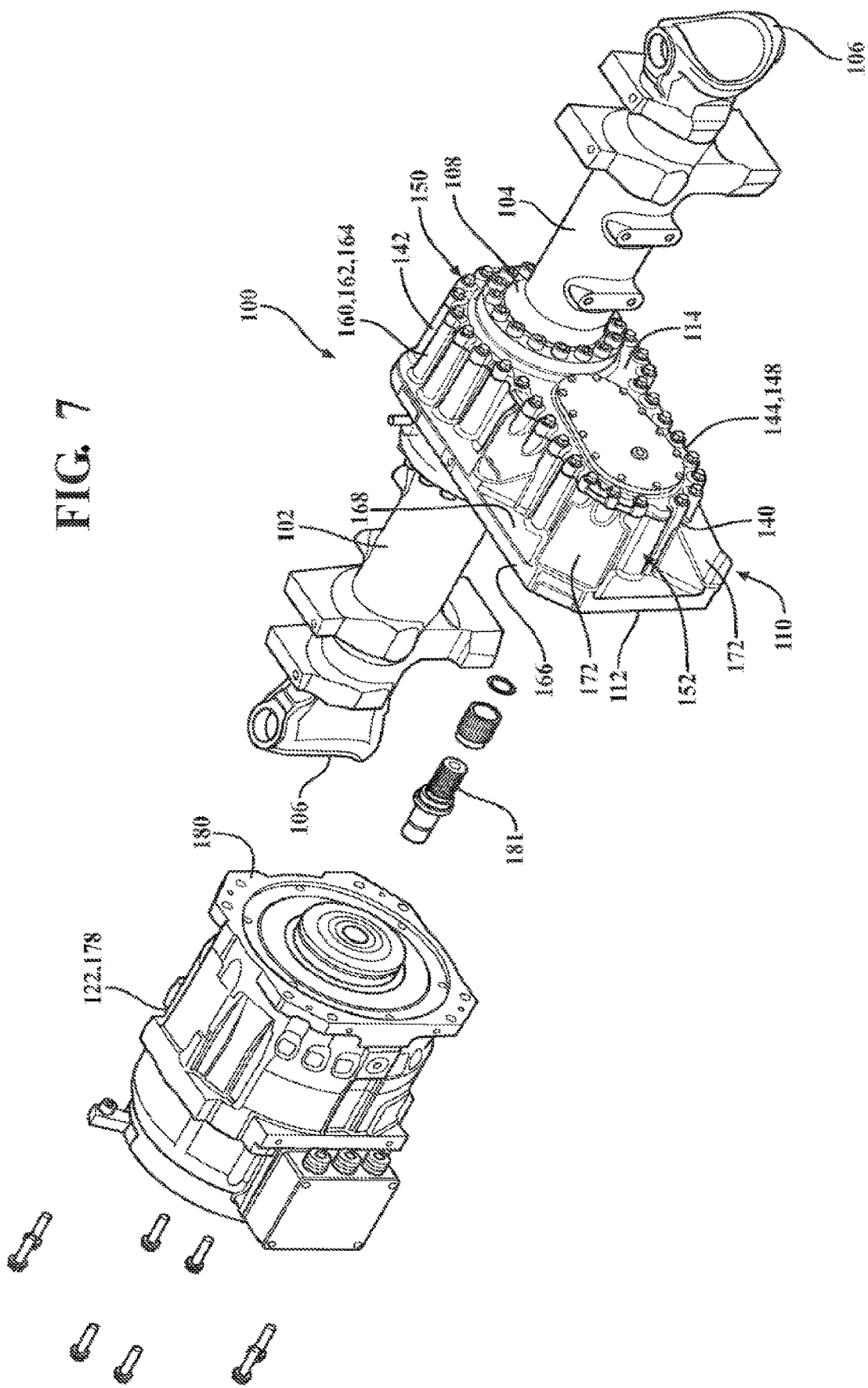
FIG. 7 is an exploded view of another portion of the axle assembly of FIG. 4.
Figure 8:
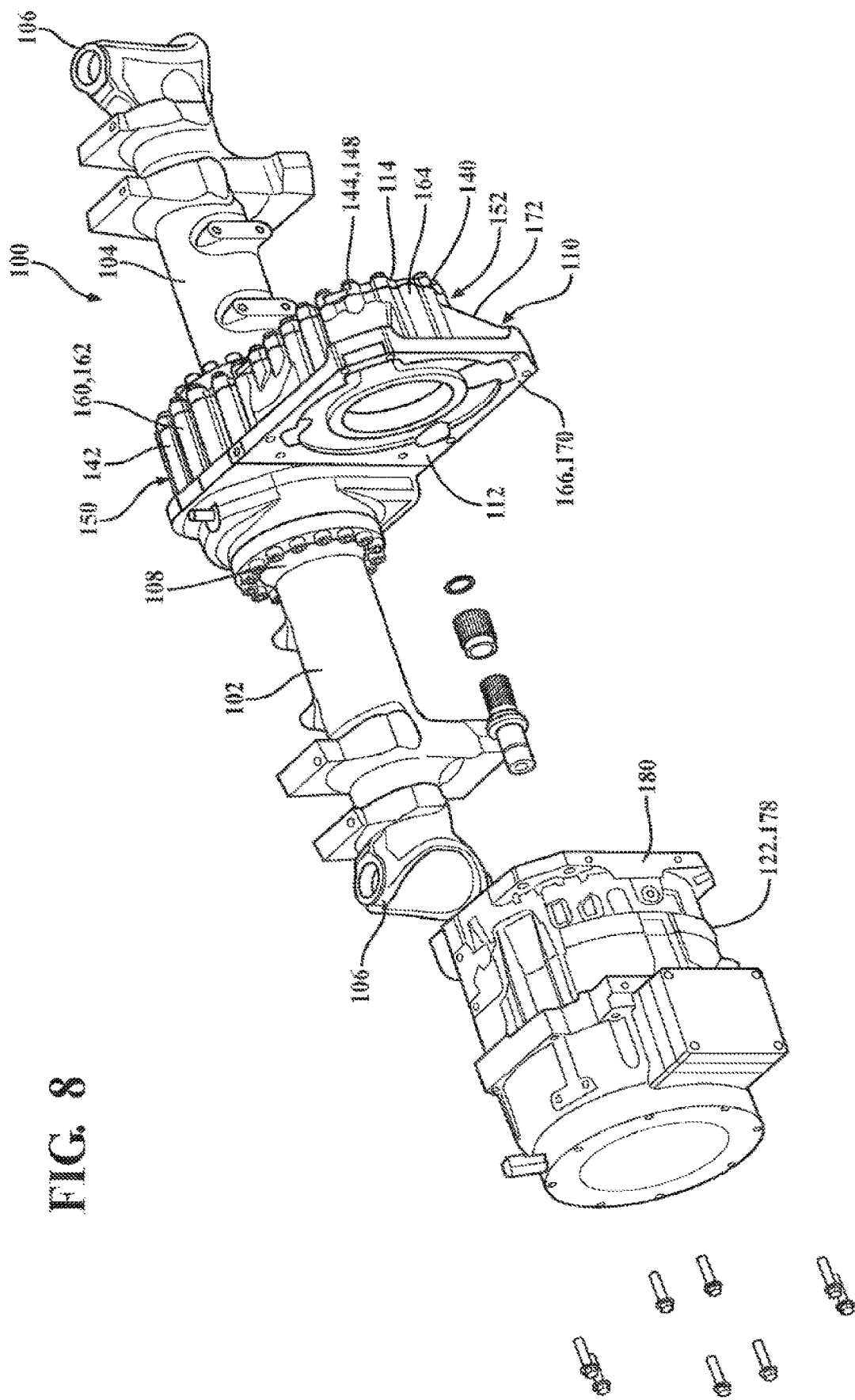
FIG. 8 is an exploded view of the portion of the axle assembly of FIG. 7 shown at a different angle.

In an embodiment, one of the first 142 and second 144 portions may define a base 154 and a continuous side wall 156 integrally coupled to the base 154. As shown in FIG. 6, the first portion 142 defines the base 154 with the continuous side wall 156. The base 154 and the side wall 156 collectively define an interior surface 158 of the first portion 142, with the interior surface 158 defining the cavity 146 for receiving and housing the gear set 132. The cavity 146 may have any suitable depth for housing the gear set 132. The shape of the cavity 146 is not particularly limited. In an embodiment, the shape of the cavity 146 may mimic or be similar to the general shape of the first portion 142 of the body 140. Alternatively, the shape of the cavity 146 may differ from the shape of the first portion 142 of the body 140.

The continuous side wall 156 of the portion 142 also defines an exterior surface 160 of the body 140 of the gearbox 110. In an embodiment, the body 140 has a plurality of corrugations 162, with the corrugations 162 being formed in or on the exterior surface 160 of the body 140. The corrugations 162 may have any shape, such as a rounded shape (resembling semi-cylinders), a polygonal shape (resembling rectangles, semi-rectangles, triangles, semi-triangles, etc.), and/or combinations thereof. Each corrugation 162 typically extends between the first 112 and second 114 surfaces of the gearbox 110. In an embodiment, the corrugations 162 are arranged adjacent one another with no spacing between the corrugations 162. Alternatively, the corrugations 162 may be spaced from one another. In an embodiment, the corrugations 162 are continuous along the entire exterior surface 160 of the body 140. In another embodiment, the corrugations 162 are discontinuous along the exterior surface 160 of the body 140. In this embodiment, corrugations 162 may be present as a single corrugation 162 or a group of corrugations 162 in selected area(s) or region(s) of the exterior surface 160 of the body 140.

The corrugations 162 may have any size, at least in terms of the width or diameter each corrugation 162. The corrugations 162 may also extend between the first 112 and second 114 surfaces of the gearbox (i.e., along the entire the height of the side wall 156), or may extend along part of the distance between the first 112 and second 114 surfaces. In addition, the corrugations 162 formed in or on the exterior surface 160 of the body 140 are substantially the same in terms of shape and size. Alternatively, the corrugations 162 may be different, where one or more corrugations 162 may be different at least in terms of shape and size from another corrugation(s) 162.

The body 140 of the gearbox 110 further has a perimeter 164, which is defined by the exterior surface 160 of the body 140. In addition, the gearbox 110 has a flange 166 extending outwardly from the perimeter 164 of the body 140. In an embodiment, the flange 166 extends from the perimeter 164 of the body 140, with the flange 166 having a larger surface area adjacent the smaller segment 152 of the body 140 and a smaller surface area adjacent the larger segment 150 of the body 140. In an alternative embodiment, the flange 166 extends from the perimeter 164 of the body 140 only along the smaller segment 152 of the body 140. The flange 166, which has the larger surface area, adjacent the smaller portion 152 of the body 140 provides additional strength to the gearbox 110 so that the gearbox 110 can suitably hold and/or support the electric motor 122 cantilevered from the gearbox 110. In an embodiment, the flange 166 adjacent the smaller segment 152 of the body 140 in combination with the corrugations 162 defined in or on the exterior surface 160 of the body 140 provides additional strength to the gearbox 110 so that the gearbox 110 can suitably hold and/or support the electric motor 122 cantilevered from the gearbox 110.

As shown, the flange 166 has first 168 and second 170 opposing flange surfaces, with the first flange surface 168 of the flange 166 adjacent to the corrugations 162 formed in or on the side wall 156 of the body 140. The second flange surface 170 of the flange 166 provides a coupling surface of the electric motor 122, and when assembled, the second flange surface 170 of the flange 166 is adjacent to the electric motor 122. The flange 166 may be made of or includes any suitable material, not limited to metals and metal alloys. In an embodiment, the flange 166 is made of or includes the same material as the body 140 of the gearbox 110.

The gearbox 110 further has a support rib 172 directly coupling the flange 166 to the body 140. In another embodiment, the gearbox 110 further has a plurality of support ribs 172 with each support rib 172 directly coupling the flange 166 to the body 140. Each of the support rib(s) 172 may have any suitable shape and size, and is typically larger than a corrugation 162 in terms of width (for example, an effective diameter of the rib 172). The support rib(s) 172 may extend between the first 112 and second 114 surfaces of the gearbox 110 (i.e., along the entire height of the side wall 156 of the body 140). Alternatively, the support rib(s) 172 may extend along part of the distance between the first 112 and second 114 surfaces of the gearbox 110.

The support rib(s) 172 may have a rounded shape, a polygonal shape, and/or combinations thereof. In one embodiment, one or more of the support ribs 172 has a tapered surface with a non-tapered end 174 adjacent the flange 166 and a tapered end 176 adjacent the second portion 144 of the body 140. The support ribs 172 may be substantially the same in terms of shape and size, or may be different. If different, one of the support ribs 172 may be different at least in terms of shape and size from another support rib 172. In addition, the support ribs 172 may be distributed in selected positions along a portion of the perimeter 164 of the body 160. In an alternative embodiment, the support ribs 172 are distributed in selected positions along the entire perimeter 164 of the body 160.

As mentioned above, the axle assembly 100 further includes the electric motor 122. While the term electric motor 122 is used, the motor 122 does not have to be electric and can instead be any suitable type of motor. It is to be understood that the electric motor 122 is schematically or semi-schematically shown in the figures, and therefore certain features of the electric motor 122 (such as the internal components of the motor 122) are not shown.

The electric motor 122 is coupled to the first 124 and second 126 drive shafts to rotate the first 116 and second 118 wheel ends. In addition, the electric motor 122 is directly coupled to the gearbox 110. The electric motor 122 may be directly coupled to the gearbox 110 in any suitable manner, such as with one or more fasteners. As shown, the electric motor 122 may have a casing 178 with an outer surface 179 and may have a generally cylindrical shape. The electric motor 122 further has internal motor components disposed within the casing 178, which are not shown. The electric motor 122 may also have a flange 180 extending outwards from the casing 178. When assembled, the flange 180 of the casing 178 aligns with and is coupled to the flange 166 of the gearbox 110 in any suitable manner, such as with one or more fasteners.

The electric motor 122 is also coupled to the gearbox 110 by a gear set 132 disposed within the cavity 146 of the gearbox 110. In an embodiment, the axle assembly 100 has a plurality of gears 181 making up the gear set 132. In one example, the gear set 132 has three gears 131, with one of the gears 181 being a pinion gear that directly couples to the electric motor 122 via an output shaft 183, another of the gears 181 being part of the differential 134, and another of the gears 181 being an idler gear disposed between the pinion and differential gears. The gears 181 are also typically disposed parallel to the axle axis $A_A$ and parallel to the width-wise axis $A_W$. The gears 181 are configured to translate energy generated by the electric motor 122 into movement of the drive shafts 124, 126. For example, the gears 181 may be configured to convert linear motion of the electric motor 122 into rotational motion of the drive shafts 124, 126 which effects rotational movement of the vehicle wheels 24.

Figure 9:
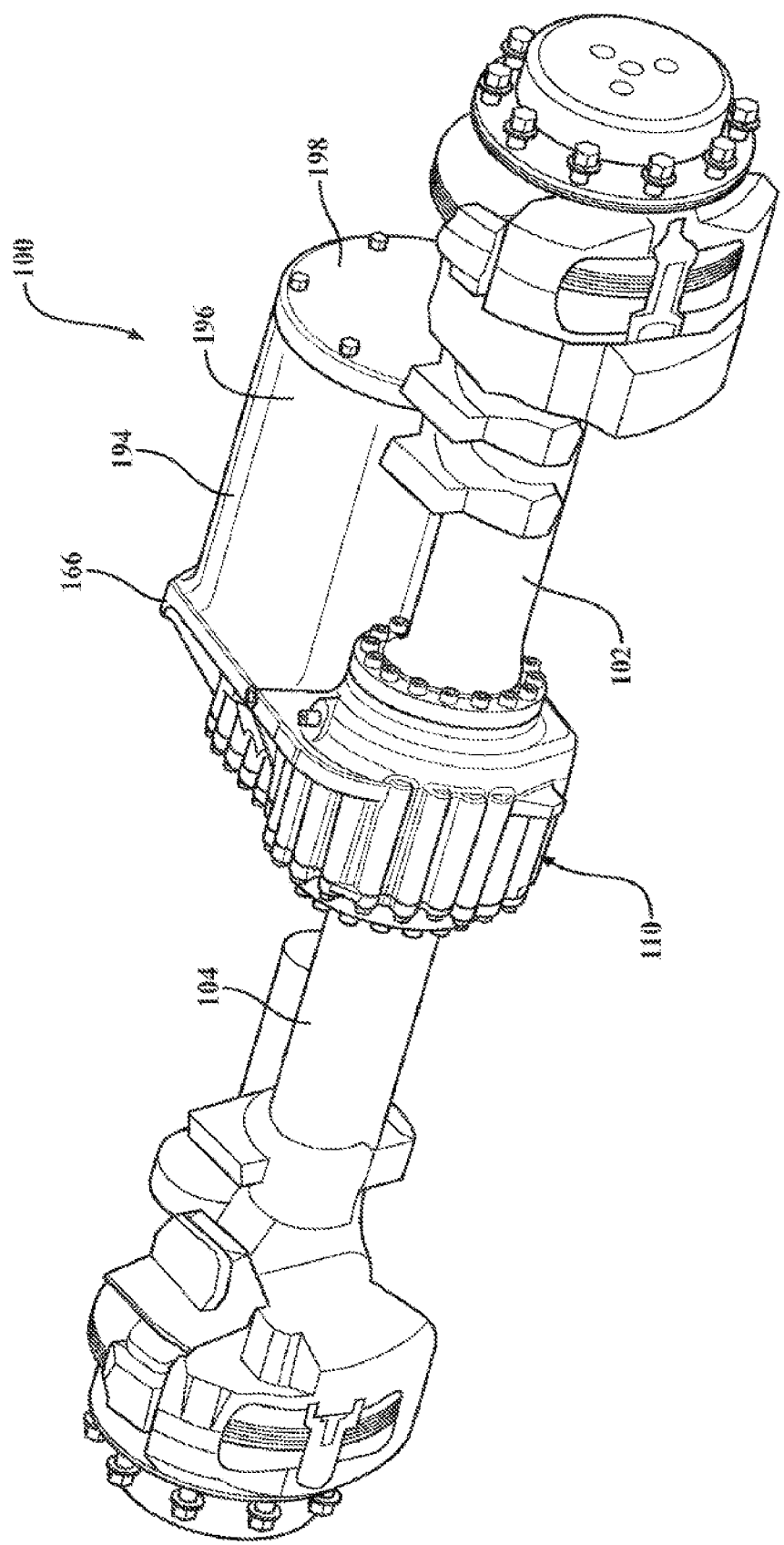
FIG. 9 is a perspective rear view of another embodiment of the axle assembly.
Figure 10:
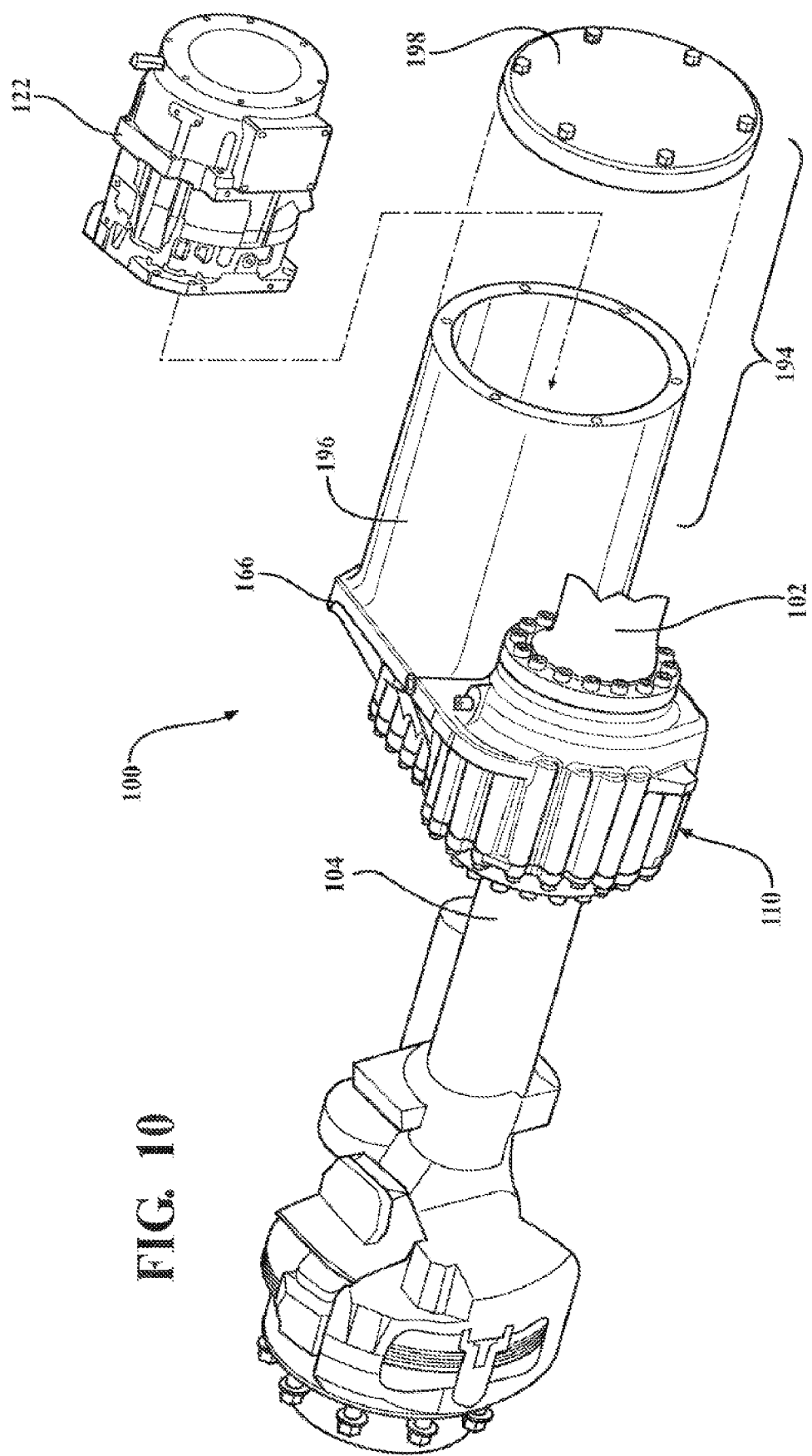
FIG. 10 is a partial exploded view of the axle assembly of FIG. 9.

In another embodiment, and as shown in FIGS. 9 and 10, the axle assembly 100 includes a motor housing 194 integrally coupled to the flange 166 of the gearbox 110 with the electric motor 122 disposed within the motor housing 194. In the embodiment shown, the motor housing 194 has a body 196 and a removable cap 198. When the cap 198 is removed, the electric motor 122 is placed within the body 196 of the motor housing 194. The cap 198 is then secured to the body 196 to enclose the electric motor 122 within the motor housing 194. The body 196 of the motor housing 194 may have any suitable shape and size. In an embodiment, the body 196 has substantially the same general shape as the electric motor 122; however, the body 196 may be slightly larger than the electric motor 122 so that the electric motor 122 can easily fit within the body 196. The motor housing 194 may also be made of or include any suitable strong material such as, but not limited to, metals and/or metal alloys.

In an embodiment, the electric motor 122 (or motor housing 194), which is coupled to the second surface 114 of the gearbox 110 and, more particularly, to the second surface 170 of the flange 166 of the gearbox 110, extends toward the first side 18 of the vehicle frame 12 to define a motor axis $A_M$. The motor axis $A_M$ is parallel to and offset from the axle axis $A_A$, and is parallel to the width-wise axis $A_W$. In addition, the motor axis $A_M$ is transverse to the gearbox axis $A_G$, and is transverse to the longitudinal axis $A_L$, and the motor axis $A_M$ is also perpendicular to the vertical axis Ay and the gearbox axis $A_G$. Accordingly, and as shown, the electric motor 122 (or motor housing 194 that houses the electric motor 122) is cantilevered from the gearbox 110.

As being cantilevered, the electric motor 122 (or motor housing 194) is coupled to the flange 166 of the gearbox 110, and is not coupled to the first axle housing 102. Accordingly, the outer surface 179 of the electric motor 122 (or the motor housing 194) is spaced from the first axle housing 102 and/or vehicle frame 12. In addition, the electric motor 122 (or motor housing 194) is spaced vertically downwardly from the floor 22 of the vehicle 10 and spaced from the vehicle frame 12.

In operation, the electric motor 122 provides power to the gearbox 110 using the internal gears 181 of the gear set 132, which transmit the power through the differential 134 and to the first 124 and second 126 drive shafts. The drive shaft 124 receives the power and rotates within the first axle housing 102 to effect rotation of the first wheel end 116. Likewise, the drive shaft 126 receives the power and rotates within the second axle housing 104 to effect rotation of the second wheel end 118. The wheel ends 116, 118, in turn, rotate and propel the wheels 24 of the vehicle 10.

Figure 11:
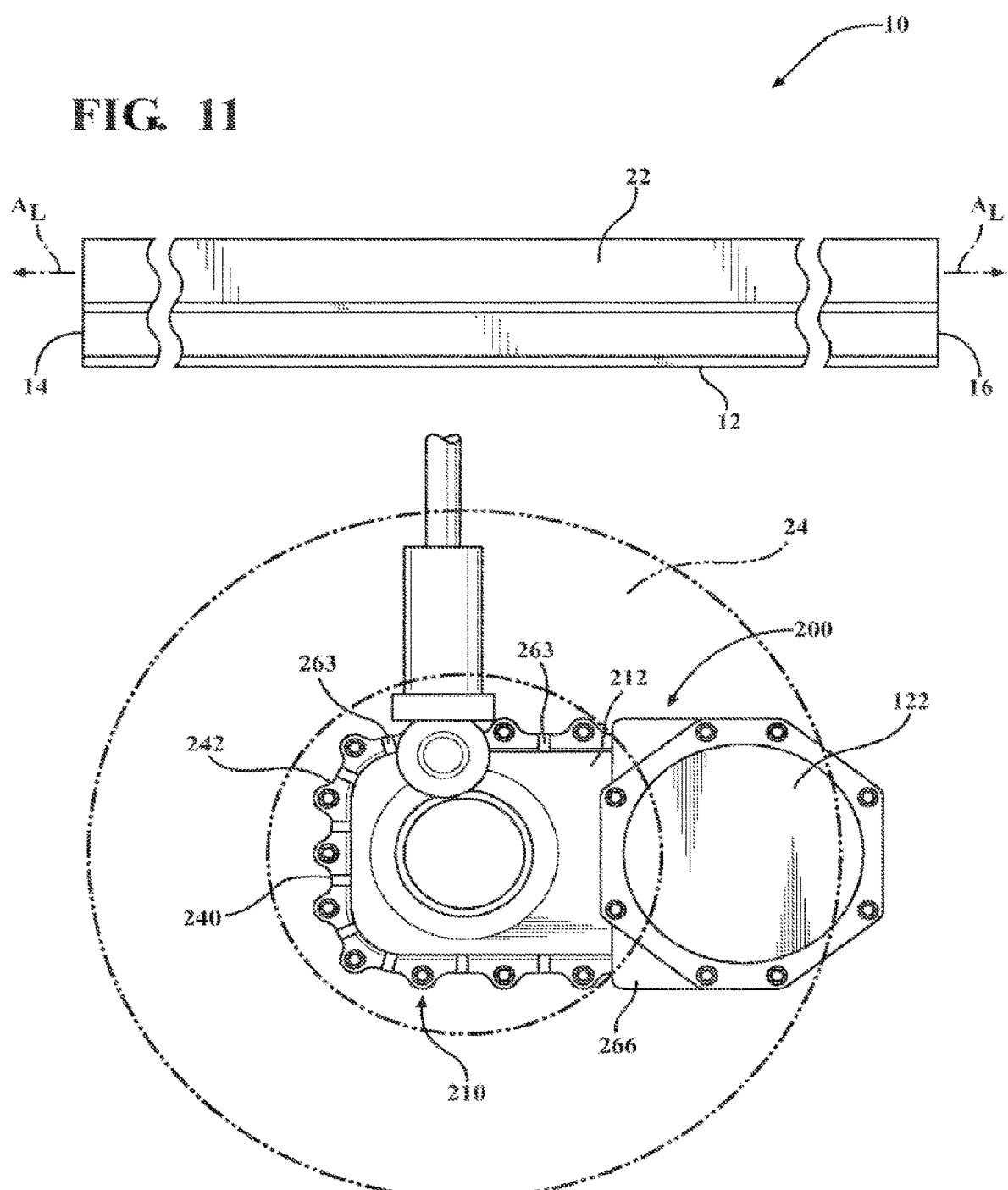
FIG. 11 is a semi-schematic side view of a portion of a vehicle illustrating a vehicle frame supporting a vehicle floor and a portion of another embodiment of an axle assembly coupled to the vehicle frame.
Figure 12:
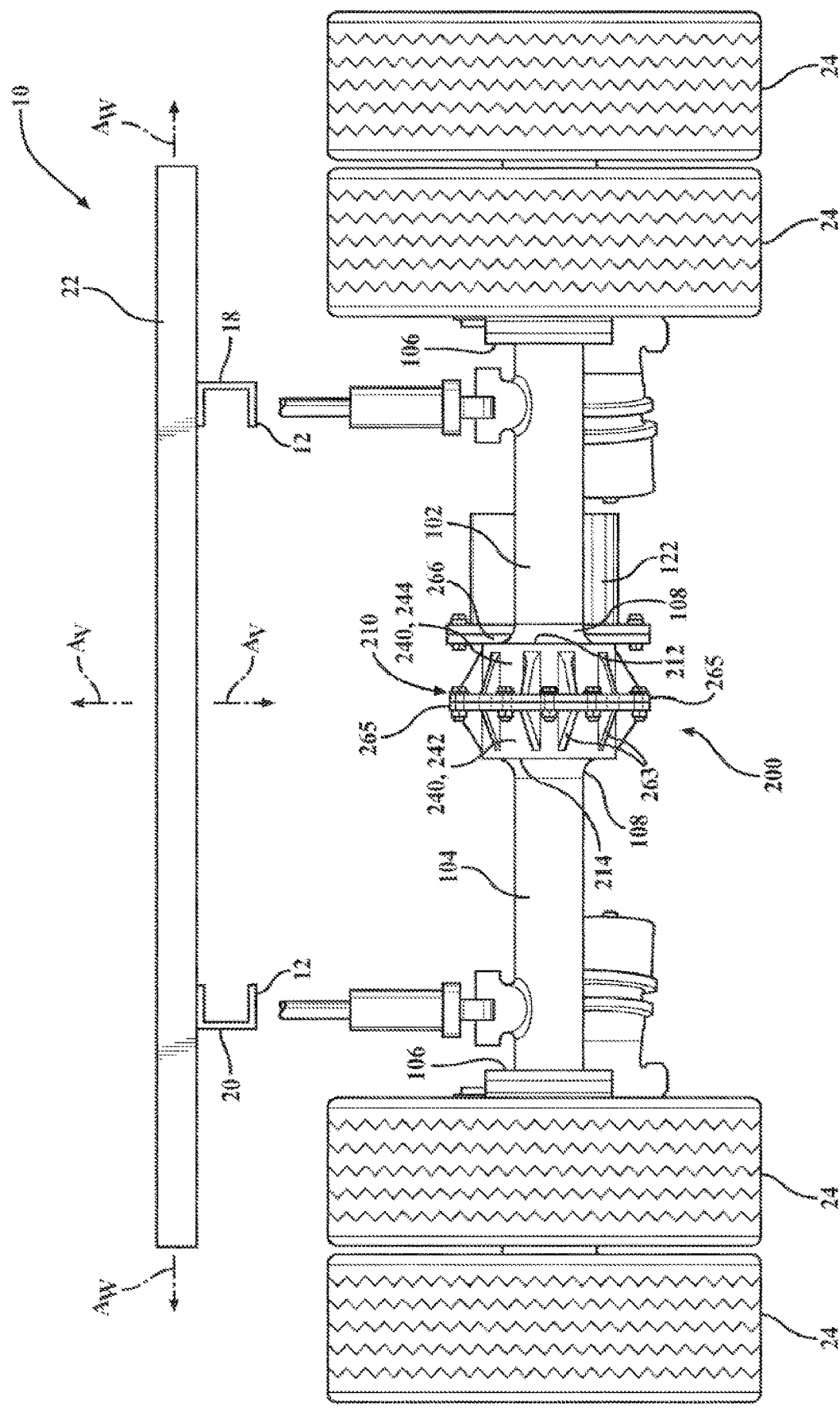
FIG. 12 is a semi-schematic rear view of a portion of the vehicle illustrating the vehicle frame supporting the vehicle floor and the axle assembly of FIG. 11 coupled to the trailer frame.
Figure 13:
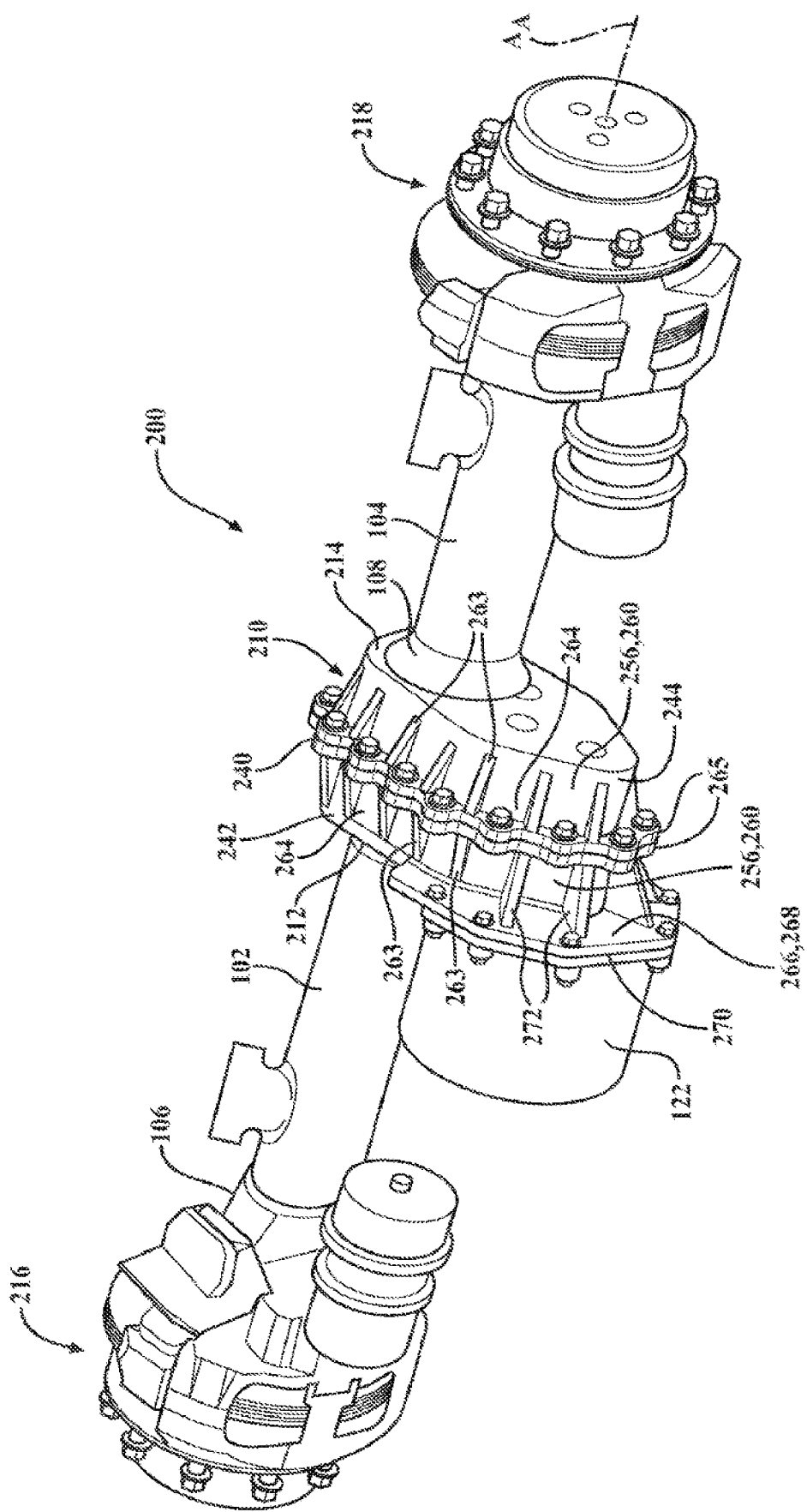
FIG. 13 is a perspective front view of the axle assembly for the vehicle illustrated in FIGS. 11 and 12.
Figure 14:
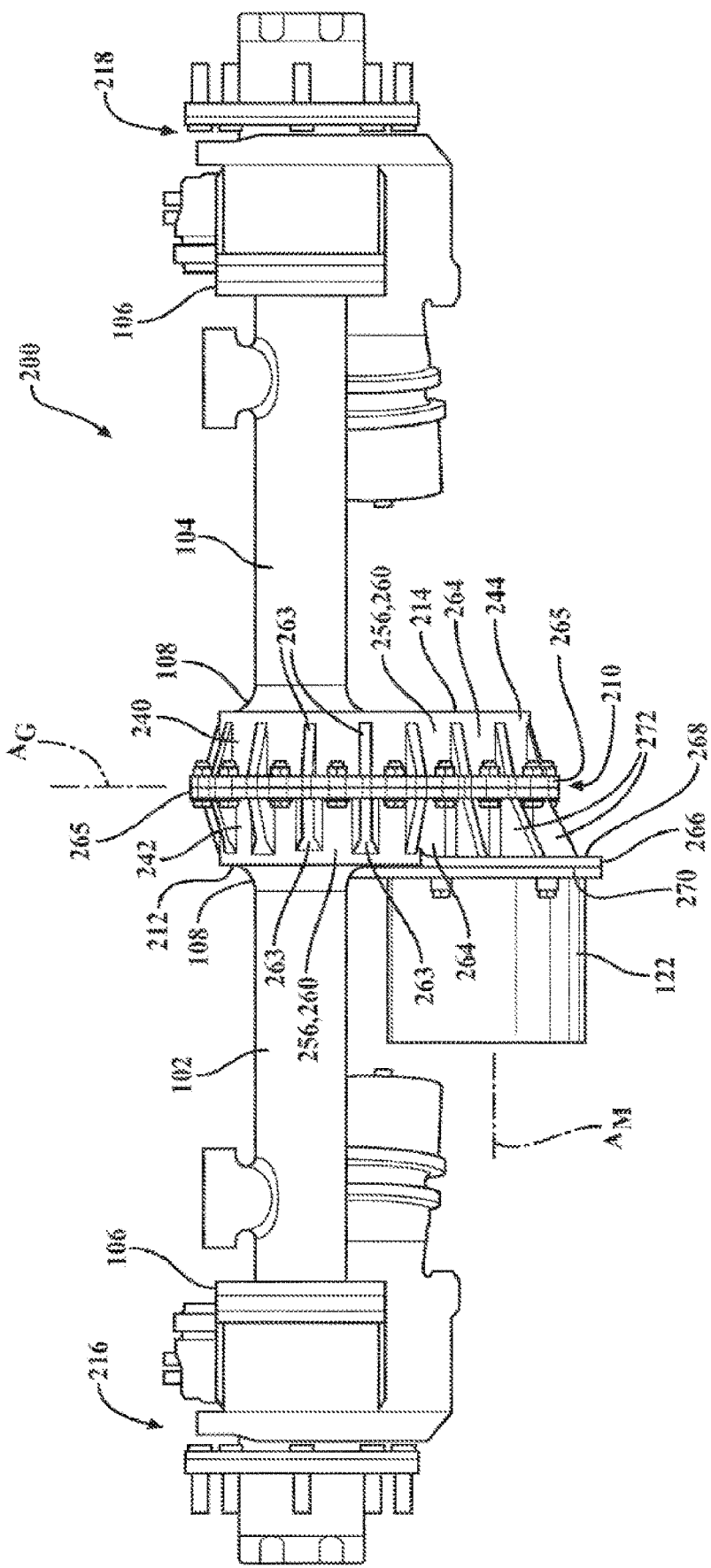
FIG. 14 is a top plan view of the axle assembly of FIG. 13.
Figure 15:
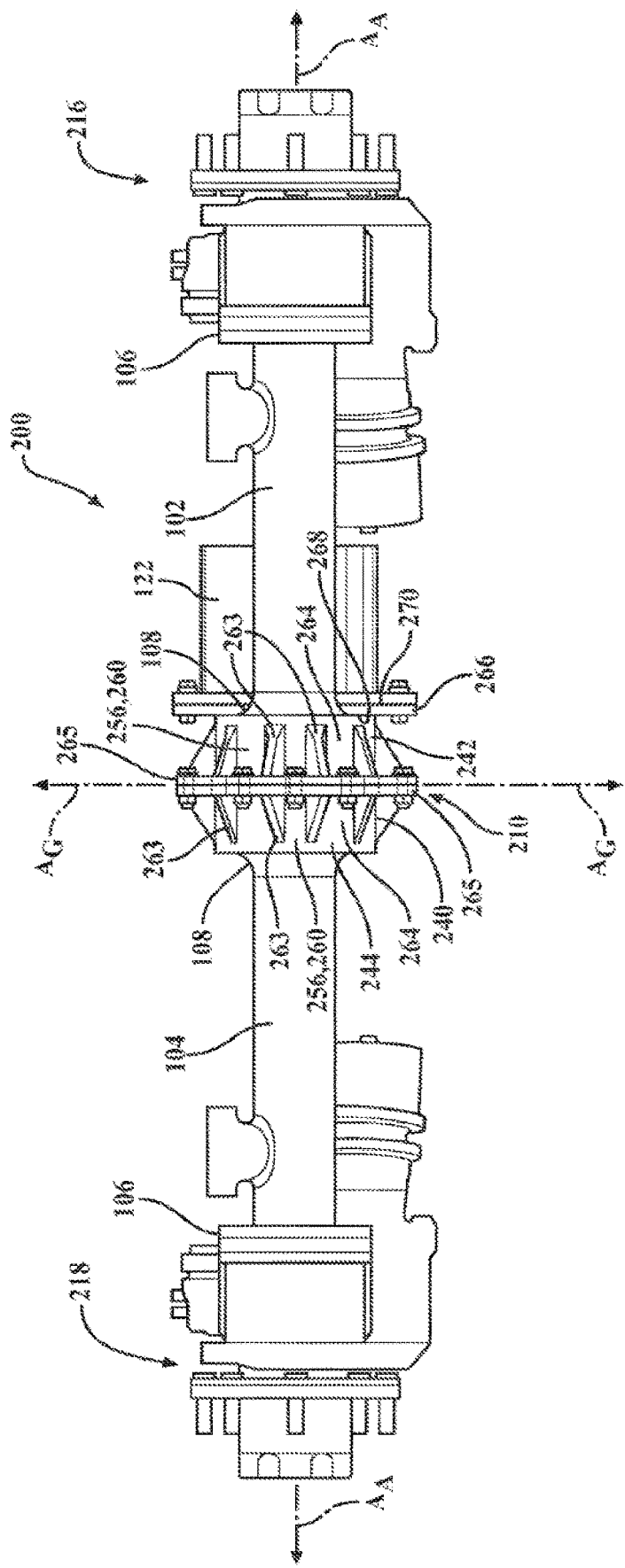
FIG. 15 is a rear view of the axle assembly of FIG. 13.

Another embodiment of the axle assembly 200 is described below with reference to FIGS. 11-16. This embodiment of the axle assembly 200 is a rigid axle that may be used for a vehicle 10, such as a trailer pulled by a semi-truck. As shown in FIGS. 11 and 12, the vehicle or trailer 10 includes a chassis having the vehicle frame 12. The vehicle frame 12 has the front 14 and rear 16 ends and opposing first 18 and second 20 sides. The vehicle or trailer 10 further includes a floor 22 coupled to the frame 12 and extending between the front 14 and rear 16 ends to define the longitudinal axis $A_L$ adapted to extend along the length of the vehicle or trailer 10. The floor 22 further extends between the first 18 and second 20 sides to define the width-wise axis $A_W$ adapted to extend along the width of the vehicle or trailer 10.

The axle assembly 200 of the present embodiment is a rigid axle. The axle assembly 200 has many of the same components as the axle assembly 100, including the first 102 and second 104 axle housings, the first 124 and second 126 drive shafts disposed at least partially within the respective first 102 and second 104 axle housings, and the electric motor 122. Details of each of these components are described above for the axle assembly 100 and shown in one or more of FIGS. 1-8. At least for purposes of simplifying the figures, it is noted that various features of the electric motor 122 and gearbox 210 of the present embodiment are shown schematically or semi-schematically in FIGS. 11-16.

The axle assembly further includes first 216 and second 218 wheel ends, with the first wheel end 216 coupled first housing end 106 of the first axle housing 102 and the second wheel end 218 coupled to the first housing end 106 of the second axle housing 102. In the present embodiment, the first 216 and second 218 wheel ends do not articulate as the axle assembly 200 is a rigid axle. In addition, each of the first 216 and second 218 wheel ends may or may not include any gears or a gear reduction.

The axle assembly 200 further includes the gearbox 210 having a body 240. The body 240 has a first surface 212 facing the first side 18 of the frame 12 and a second surface 214 facing the second side 20 of the frame 12. As shown, the first axle housing 102 is coupled to the first surface 212 of the body 240, and the second axle housing 104 is coupled to the second surface 214 of the body 240. In addition, the gearbox 210 is cantilevered outwardly relative to the aligned first 102 and second 104 axle housings to define the gearbox axis $A_G$ parallel to the longitudinal axis $A_L$ and transverse to the axle axis $A_A$. The gearbox 210 is also spaced vertically downward from the floor 22 of the vehicle or trailer 10 along the vertical axis Ay perpendicular to and intersecting both of the axle axis $A_A$ and the gearbox axis $A_G$.

Figure 16:
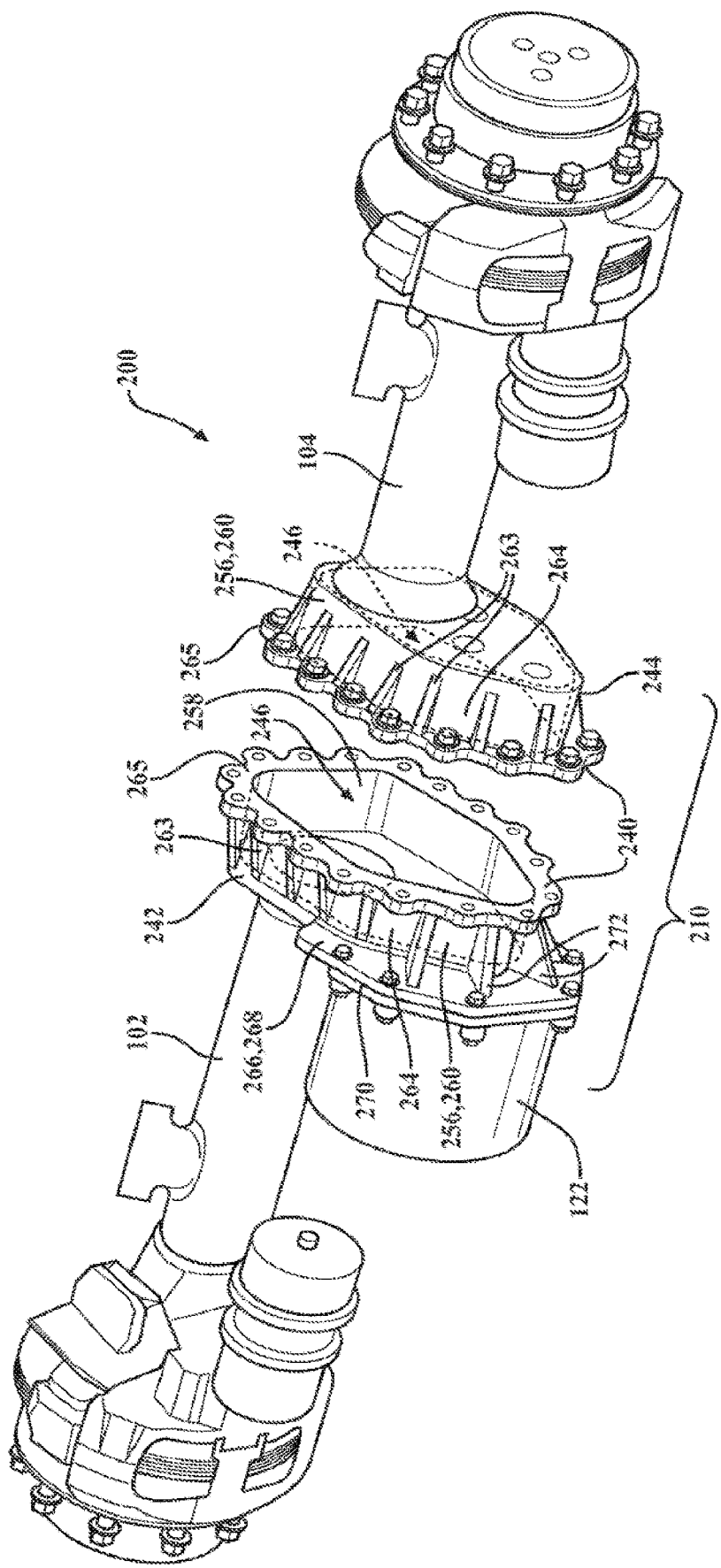
FIG. 16 is a partial exploded view of the axle assembly of FIG. 13.

The body 240 of the gearbox 210 has multiple portions. In this embodiment, the body 240 has a first portion 242 and a second portion 244. As shown in FIG. 16, the first 242 and second 244 portions are substantially equal to define a cavity 246 for receiving a gear set (not shown). In an embodiment, the cavity 246 receives a gear set similar to the gear set 132 described above. Each of the first 242 and second 244 portions of the body 140 defines the cavity 246, where part of the cavity 246 is defined in the first portion 242 and the another part of the cavity 246 is defined in the second portion 244. It is contemplated that the body 240 of the gearbox 210 can be made from any suitable material, not limited to metals and/or metal alloys.

The body 240 of the gearbox 210 may have any suitable shape. In an embodiment, the body 240 has an oblong shape, which may resemble an oval shape or a rectangular shape with soft or rounded edges. In addition, each of the first 242 and second 244 portions of the body 240 define a side wall 256 having an interior surface 258. The interior surfaces 258 of the first 242 and second 244 portions collectively define the cavity 246 for receiving the gear set. The cavity 246 may have any suitable size/depth for housing the gear set. The shape of the cavity 246 is also not particularly limited.

The side walls 256 of the first 242 and second 244 portions define an exterior surface 260 of the body 240 of the gearbox 210. In an embodiment, the body 240 has a plurality of body ribs 263, with the body ribs 263 being formed on the exterior surface 260 of the body 240. In particular, the body ribs 263 are formed on the side walls 256 of both the first 242 and second 244 portions of the body 240. The body ribs 263 may have any shape, such a wedge shape as shown. Alternatively, the body ribs 263 may have a rounded shape, a polygonal shape, and/or combinations thereof. The body ribs 263 are spaced from one another, and are distributed along the entire side wall 256 of each of the portions 242, 244. In an embodiment, a body rib 263 formed on the side wall 256 of the first portion 242 is aligned with a body rib 263 formed on the side wall 256 of the second portion 244.

The body ribs 263 may have any size, at least in terms of the width defined across each body rib 263. Each body rib 263 may extend entirely or partially along the height of the side wall 256 of each of the portions 242, 244. In one embodiment, and as shown, the body ribs 263 extend along the entire height of the side wall 256 of the first portion 242, while the body ribs 263 extend partially along the height of the side wall 256 of the second portion 244. In addition, the body ribs 263 may be substantially the same in terms of shape and size. Alternatively, the body ribs 263 may be different, where one or more body ribs 263 may be different at least in terms of shape and size from another body rib 263.

Each of the first 242 and second 244 portions of the body 240 has a perimeter 264, which is defined by the exterior surface 260 of the portions 242, 244. In addition, each of the portions 242, 244 has a lip 265, and the lips 265 are aligned for coupling the first portion 242 with the second portion 244 such as, for example, with a plurality of fasteners.

The first portion 242 of the body 240 further has a flange 266 extending outwardly from the perimeter 264 of the first portion 242. In an embodiment, the flange 266 has a larger surface area than the first portion 242 and provides additional strength to the gearbox 210 so that the gearbox 210 can suitable hold and/or support the electric motor 122 that is cantilevered from the gearbox 210. In an embodiment, the flange 266 in combination with the body ribs 263 on the side walls 256 of the first 242 and second 244 portions of the body 240 provides additional strength to the gearbox 210 so that the gearbox 210 can suitably hold and/or support the electric motor 122 that is cantilevered from the gearbox 210.

As shown, the flange 266 has first 268 and second 270 opposing flange surfaces, with the first flange surface 268 of the flange 266 adjacent to the body ribs 263 on the side wall 256 of first portion 242 of the body 140. The second flange surface 270 of the flange 266 provides a coupling surface for the electric motor 122, and when assembled, the second flange surface 270 of the flange 266 is adjacent to the electric motor 122. The flange 266 may be made of or includes any suitable material, not limited to metals and metal alloys. In an embodiment, the flange 266 is made of or includes the same material as the body 240 of the gearbox 210.

The gearbox 110 further has a support rib 272 directly coupling the flange 266 to the body 240. In another embodiment, the gearbox 210 further has a plurality of support ribs 272 with each support rib 272 directly coupling the flange 266 to the body 240. Each of the support rib(s) 272 may have any suitable shape and size, and is typically larger than one of the body ribs 263. The support rib(s) 272 may extend along the entire height of the side wall 256 of the first portion 242 of the body 240.

The support rib(s) 272 may have any suitable shape. In an embodiment, and as shown, the support ribs 272 have a wedge shape, with the larger end of the wedge adjacent the flange 266. The support ribs 272 may be substantially the same in terms of shape and size, or may be different. If different, one of the support ribs 272 may be different at least in terms of shape and size from another support rib 272. In addition, the support ribs 272 may be distributed in selected positions along a portion of the perimeter 264 of the body 260.

Various embodiments of the axle assembly 100, 200 have been described in detail above. These embodiments overcome challenges associated with effectively attaching the electric motor to the gearbox of the axle assembly within limited available space under the vehicle floor. For example, a challenge with having an electric motor extending from the gearbox toward one of the sides of the vehicle frame, such that the electric motor is parallel with the drive shaft, is that the electric motor could experience an undesirable bending moment. This bending moment may be caused, at least in part, from several g-force accelerations experienced by the electric motor in a vertical direction when the vehicle is traveling over blemishes in the road. The bending moment may also be caused, at least in part, from vibrations generated by internal rotating components of the electric motor. The axle assemblies 100, 200 of the present disclosure overcome this challenge by providing a structurally superior gearbox 110, 210 that can transmit the load experienced by the axle assembly 100, 200 (for example, from the weight of the vehicle 10 and the passenger(s)/cargo inside the vehicle 10) to the first 102 and second 104 axle housings. The axle assembly 100, 200 can support more than ten g-force accelerations experienced by the electric motor 122.

In addition, the arrangement of the electric motor 122 relative to the gearbox 110, 210 is such that the electric motor 122 is positioned adjacent the first axle housing 102, and not above the first axle housing 102. In this way, the electric motor 122 does not occupy space between the frame 12, 32 and the axle assembly 100, 200. When used as a mass transit vehicle, such as a commercial bus, the spatial arrangement or position of the electric motor 122 provides the necessary clearance between the axle assembly 100 and the vehicle floor 22. Accordingly, the axle assembly 100 does not restrict the travel distance of the suspension components 136, 138, which could otherwise adversely affect handling and the overall ride quality of the vehicle 10. In addition, with good clearance, the floor 22 of the vehicle 10 can be positioned closer to the ground, which increases the space within the passenger compartment of the vehicle 10.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

The invention claimed is:

1. An axle assembly comprising:
    a gearbox comprising:
        a first portion having a first lip, a first outer surface spaced apart from the first lip, and a first sidewall extending from the first lip to the first outer surface, wherein the first lip extends outwardly from the first sidewall,
        a second portion having a second lip, a second outer surface spaced apart from the second lip, and a second sidewall extending from the second lip to the second outer surface, wherein the first and second lips are configured to mate with each other to allow attachment of the first portion and the second portion and wherein the first and second portions, when attached to each other, define an inner cavity,
        a flange extending outwardly from first sidewall of the first portion and including a mounting surface coplanar with the first outer surface and an inner surface opposite the mounting surface, wherein the mounting surface is configured to support attachment of a motor thereto, and
        a set of support ribs coupled to the first sidewall and the inner surface of the flange;
    a first axle housing coupled to the first outer surface of the first portion and extending away therefrom; and
    a second axle housing coupled to the second outer surface and extending away therefrom in a direction opposite the first axle housing.

2. The axle assembly of claim 1, further comprising a first plurality of body ribs coupled to the first portion of the gearbox and a second plurality of body ribs coupled to the second portion of the gearbox.

3. The axle assembly of claim 2, wherein each body rib of the first plurality of body ribs is coupled to the first sidewall and the first lip of the first portion of the gearbox and wherein each body rib of the second plurality of body ribs is coupled to the second sidewall and the second lip of the second portion of the gearbox.

4. The axle assembly of claim 3, wherein each body rib of the first plurality of body ribs is wedge shaped and includes a first side attached to the first sidewall and a second side, shorter than the first side, attached to the first lip, and
wherein each body rib of the second plurality of body ribs is wedge shaped and includes a third side attached to the second sidewall and a fourth side, shorter than the third side, attached to the second lip.

5. The axel assembly of claim 4, wherein the first side of each body rib of the first plurality of body ribs extends along the entirety of a height of the first sidewall, and wherein the third side of each body rib of the second plurality of body ribs extends along the entirety of a height of the second sidewall.

6. The axle assembly of claim 2, wherein each body rib of the first plurality of body ribs is aligned with a corresponding body rib of the second plurality of body ribs when then the first portion of the gearbox is attached to the second portion of the gearbox.

7. The axle assembly of claim 2, wherein each support rib of the set of support ribs is larger than each body rib of the first and second pluralities of body ribs.

8. The axle assembly of claim 1, wherein each support rib of the set of support ribs is wedge shape and includes a first side attached to the first sidewall and a second side, shorter than the first side, attached to the inner surface of the flange.

9. The axle assembly of claim 1, wherein each support rib of the set of support ribs has the same size and shape.

10. The axle assembly of claim 1, further comprising a plurality of body ribs coupled to the second sidewall and the second lip of the second portion of the gearbox,
wherein each support rib of the set of support ribs is aligned with a corresponding body rib of the plurality of body ribs when then the first portion of the gearbox is attached to the second portion of the gearbox.

11. The axle assembly of claim 1, wherein the first axle housing and the second axle housing define an axle axis and wherein the gearbox is cantilevered relative to the aligned first and second axle housings to define a gearbox axis transverse to the axle axis.

12. The axle assembly of claim 1, further comprising a gearset received in the inner cavity defined by the first and second portions, wherein the gearset mechanically couples the electric motor to a first drive shaft housed in the first axle housing and to a second drive shaft housed in the second axle housing.

13. A gearbox comprising:
a first portion having a first lip, a first outer surface spaced apart from the first lip, and a first sidewall extending from the first lip to the first outer surface, wherein the first lip extends outwardly from the first sidewall;
a second portion having a second lip, a second outer surface spaced apart from the second lip, and a second sidewall extending from the second lip to the second outer surface, wherein the first and second lips are configured to mate with each other to allow attachment of the first portion and the second portion and wherein the first and second portions, when attached to each other, define an inner cavity;
a first plurality of body ribs coupled to the first sidewall and the first lip;
a second plurality of body ribs coupled to the second sidewall and the second lip;
a flange extending outwardly from first sidewall of the first portion and including a mounting surface coplanar with the first outer surface and an inner surface opposite the mounting surface, wherein the mounting surface is configured to support attachment of a motor thereto; and
a set of support ribs coupled to the first sidewall and the inner surface of the flange.

14. The gearbox of claim 13, wherein each body rib of the first plurality of body ribs is wedge shaped and includes a first side attached to the first sidewall and a second side, shorter than the first side, attached to the first lip, and
wherein each body rib of the second plurality of body ribs is wedge shaped and includes a third side attached to the second sidewall and a fourth side, shorter than the third side, attached to the second lip.

15. The axel assembly of claim 14, wherein the first side of each body rib of the first plurality of body ribs extends along the entirety of a height of the first sidewall, and wherein the third side of each body rib of the second plurality of body ribs extends along the entirety of a height of the second sidewall.

16. The axle assembly of claim 13, wherein each body rib of the first plurality of body ribs is aligned with a corresponding body rib of the second plurality of body ribs when then the first portion of the gearbox is attached to the second portion of the gearbox.

17. The axle assembly of claim 13, wherein each support rib of the set of support ribs is larger than each body rib of the first and second pluralities of body ribs.

18. The axle assembly of claim 13, wherein each support rib of the set of support ribs is wedge shape and includes a first side attached to the first sidewall and a second side, shorter than the first side, attached to the inner surface of the flange.

19. The axle assembly of claim 13, wherein each support rib of the set of support ribs has the same size and shape.

20. The axle assembly of claim 13, further comprising a plurality of body ribs coupled to the second sidewall and the second lip of the second portion of the gearbox,
wherein each support rib of the set of support ribs is aligned with a corresponding body rib of the plurality of body ribs when then the first portion of the gearbox is attached to the second portion of the gearbox.

* * * * *